(12) United States Patent
Jung et al.

(10) Patent No.: US 9,088,450 B2
(45) Date of Patent: Jul. 21, 2015

(54) METHODS AND SYSTEMS FOR DATA SERVICES

(71) Applicant: Elwha LLC, Bellevue, WA (US)

(72) Inventors: Edward K. Y. Jung, Bellevue, WA (US); Royce A. Levien, Lexington, MA (US); Richard T. Lord, Tacoma, WA (US); Robert W. Lord, Seattle, WA (US); Mark A. Malamud, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 214 days.

(21) Appl. No.: 13/385,604

(22) Filed: Oct. 31, 2012

(65) Prior Publication Data

US 2014/0122714 A1    May 1, 2014

(51) Int. Cl.
*G06F 15/16* (2006.01)
*H04L 29/06* (2006.01)
*H04L 29/08* (2006.01)
*G06F 21/60* (2013.01)
*H04L 12/24* (2006.01)
*G06F 21/62* (2013.01)
*G06F 12/00* (2006.01)

(52) U.S. Cl.
CPC ............ *H04L 29/0602* (2013.01); *G06F 21/60* (2013.01); *G06F 21/6218* (2013.01); *G06F 21/6254* (2013.01); *H04L 29/06* (2013.01); *H04L 29/06551* (2013.01); *H04L 29/0899* (2013.01); *H04L 41/00* (2013.01); *H04L 41/5054* (2013.01); *H04L 63/10* (2013.01); *H04L 67/32* (2013.01); *G06F 2221/2107* (2013.01); *G06F 2221/2111* (2013.01); *G06F 2221/2117* (2013.01); *G06F 2221/2141* (2013.01); *G06F 2221/2149* (2013.01); *G06F 2221/2153* (2013.01)

(58) Field of Classification Search
USPC .......................... 709/203, 204, 223–229, 250
See application file for complete search history.

(56) References Cited

U.S. PATENT DOCUMENTS

| | | | |
|---|---|---|---|
| 6,122,520 A | 9/2000 | Want et al. | |
| 6,871,277 B1 | 3/2005 | Keronen | |
| 7,178,034 B2 | 2/2007 | Cihula et al. | |
| 7,203,752 B2 | 4/2007 | Rice et al. | |
| 7,269,853 B1 | 9/2007 | Dunn | |
| 7,685,238 B2 | 3/2010 | Etelapera | |
| 7,849,311 B2 | 12/2010 | Donlin et al. | |
| 7,860,807 B2 | 12/2010 | Kaneko et al. | |
| 7,913,312 B2 | 3/2011 | de Jong | |
| 7,917,154 B2 * | 3/2011 | Fortescue et al. | 455/456.1 |
| 7,996,682 B2 | 8/2011 | Schutz et al. | |
| 8,364,389 B2 | 1/2013 | Dorogusker et al. | |

(Continued)

FOREIGN PATENT DOCUMENTS

| | | |
|---|---|---|
| EP | 1818807 A | 8/2007 |
| WO | WO 01/28273 A1 | 4/2001 |

OTHER PUBLICATIONS

PCT International Search Report; International App. No. PCT/US14/19562; Jun. 10, 2014; pp. 1-2.

(Continued)

*Primary Examiner* — Zarni Maung

(57) ABSTRACT

A method substantially as shown and described the detailed description and/or drawings and/or elsewhere herein. A device substantially as shown and described the detailed description and/or drawings and/or elsewhere herein.

29 Claims, 24 Drawing Sheets

(56) References Cited

U.S. PATENT DOCUMENTS

| | | |
|---|---|---|
| 8,387,155 B2 | 2/2013 | Gregg et al. |
| 8,578,483 B2 | 11/2013 | Seshadri et al. |
| 8,756,321 B2 | 6/2014 | Clark et al. |
| 2001/0025316 A1 | 9/2001 | Oh |
| 2003/0023726 A1 | 1/2003 | Rice et al. |
| 2004/0128500 A1 | 7/2004 | Cihula et al. |
| 2005/0278342 A1* | 12/2005 | Abdo et al. ............. 707/10 |
| 2006/0010047 A1 | 1/2006 | Minor |
| 2007/0113079 A1 | 5/2007 | Ito et al. |
| 2007/0136466 A1 | 6/2007 | Etelapera |
| 2007/0232268 A1 | 10/2007 | Park et al. |
| 2007/0273583 A1* | 11/2007 | Rosenberg ............. 342/367 |
| 2008/0102856 A1 | 5/2008 | Fortescue et al. |
| 2008/0153670 A1 | 6/2008 | McKirdy et al. |
| 2010/0024020 A1 | 1/2010 | Baugher et al. |
| 2010/0082237 A1 | 4/2010 | Black |
| 2010/0324819 A1 | 12/2010 | Nurminen et al. |
| 2011/0022468 A1 | 1/2011 | Muster et al. |
| 2011/0179366 A1 | 7/2011 | Chae |
| 2011/0295899 A1* | 12/2011 | James et al. ............. 707/784 |
| 2012/0036345 A1 | 2/2012 | Chen et al. |
| 2012/0054841 A1 | 3/2012 | Schultz et al. |
| 2012/0084247 A1 | 4/2012 | Aguera y Arcas et al. |
| 2012/0089465 A1 | 4/2012 | Froloff |
| 2012/0096080 A1 | 4/2012 | Levesque et al. |
| 2012/0143662 A1 | 6/2012 | Heath |
| 2012/0185912 A1 | 7/2012 | Lee et al. |
| 2012/0209923 A1 | 8/2012 | Mathur et al. |
| 2012/0291101 A1 | 11/2012 | Ahlstrom et al. |
| 2013/0014212 A1 | 1/2013 | Cohen |
| 2013/0046632 A1 | 2/2013 | Grigg et al. |
| 2013/0124546 A1* | 5/2013 | Wormley et al. ............. 707/758 |
| 2013/0179244 A1 | 7/2013 | Laffoon et al. |
| 2013/0179988 A1 | 7/2013 | Bekker et al. |
| 2013/0219461 A1* | 8/2013 | Esaki et al. ............. 726/1 |
| 2013/0263000 A1 | 10/2013 | Lucas et al. |
| 2013/0263206 A1 | 10/2013 | Nefedov et al. |
| 2013/0282227 A1 | 10/2013 | Chen et al. |
| 2013/0290359 A1 | 10/2013 | Eronen et al. |
| 2013/0318627 A1 | 11/2013 | Lundkvist et al. |
| 2013/0339234 A1 | 12/2013 | Prakash et al. |
| 2014/0006616 A1 | 1/2014 | Aad et al. |
| 2014/0031959 A1 | 1/2014 | Glode et al. |
| 2014/0059695 A1 | 2/2014 | Parecki et al. |
| 2014/0122890 A1 | 5/2014 | Prot |
| 2014/0123300 A1* | 5/2014 | Jung et al. ............. 726/26 |
| 2014/0195349 A1 | 7/2014 | Muster et al. |

OTHER PUBLICATIONS

Zhou, Yajin et al., "Taming Information-Stealing Smartphone Applications (on Android)," Proceedings of the 4th International Conference on Trust and Trustworthy Computing, Pittsburgh, PA, Jun. 2011, 15 pages.

Reddy et al.; "Biketastic: Sensing and Mapping for Better Biking"; CHI 2010; Apr. 10-15, 2010; pp. 1-4; ACM; located at http://research.cens.ucla.edu/people/estrin/resources/conferences/2010apr-Reddy-Shilton-Biketastic.pdf.

* cited by examiner

FIG. 1D
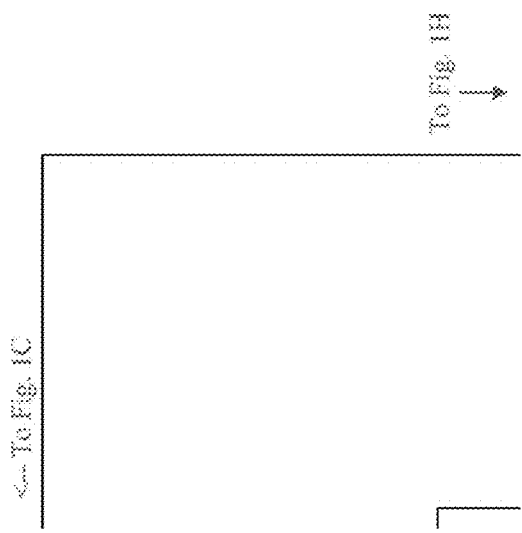

To Fig. 1A →

X No Additional Structures Illustrated on this Page

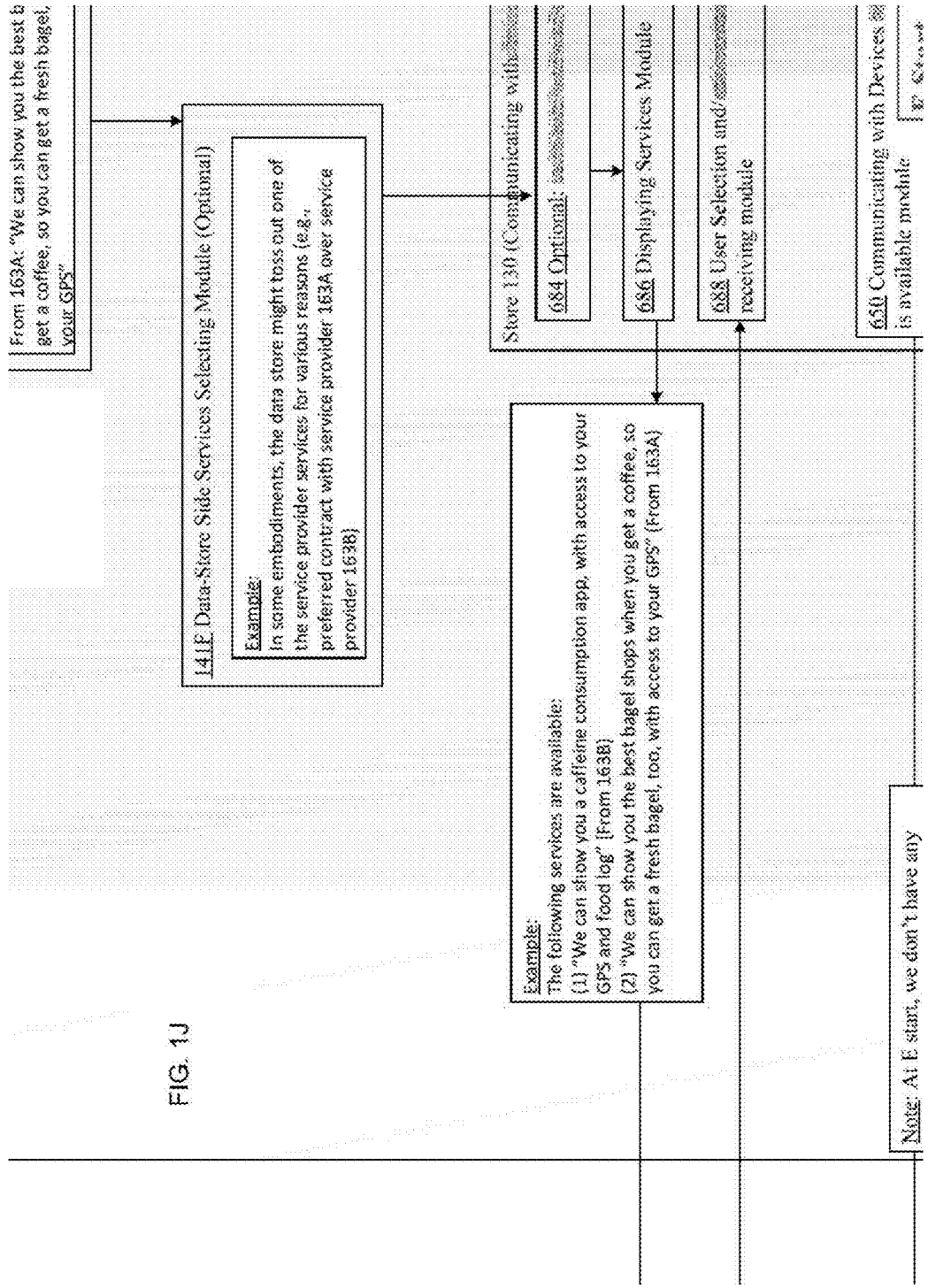

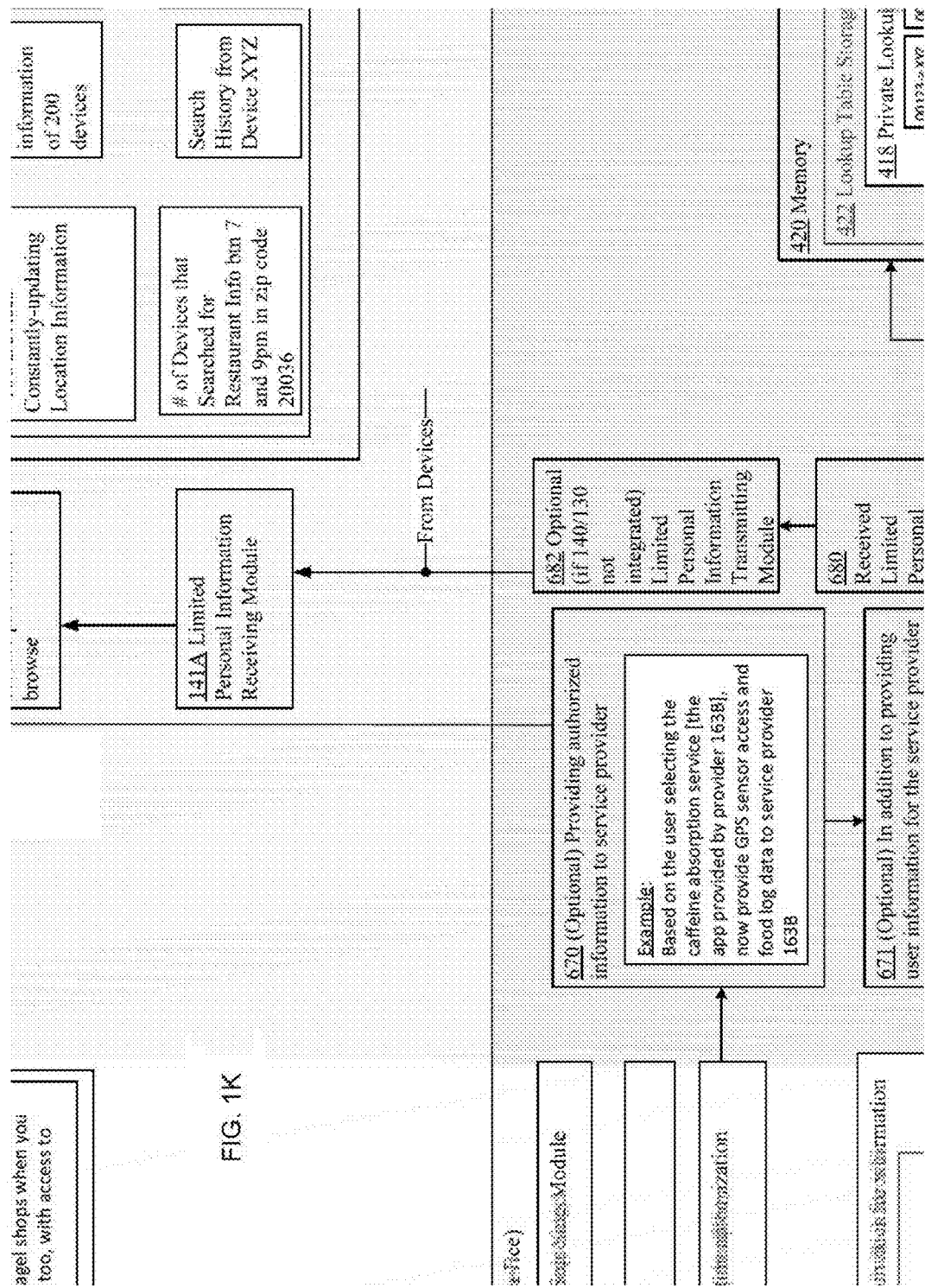

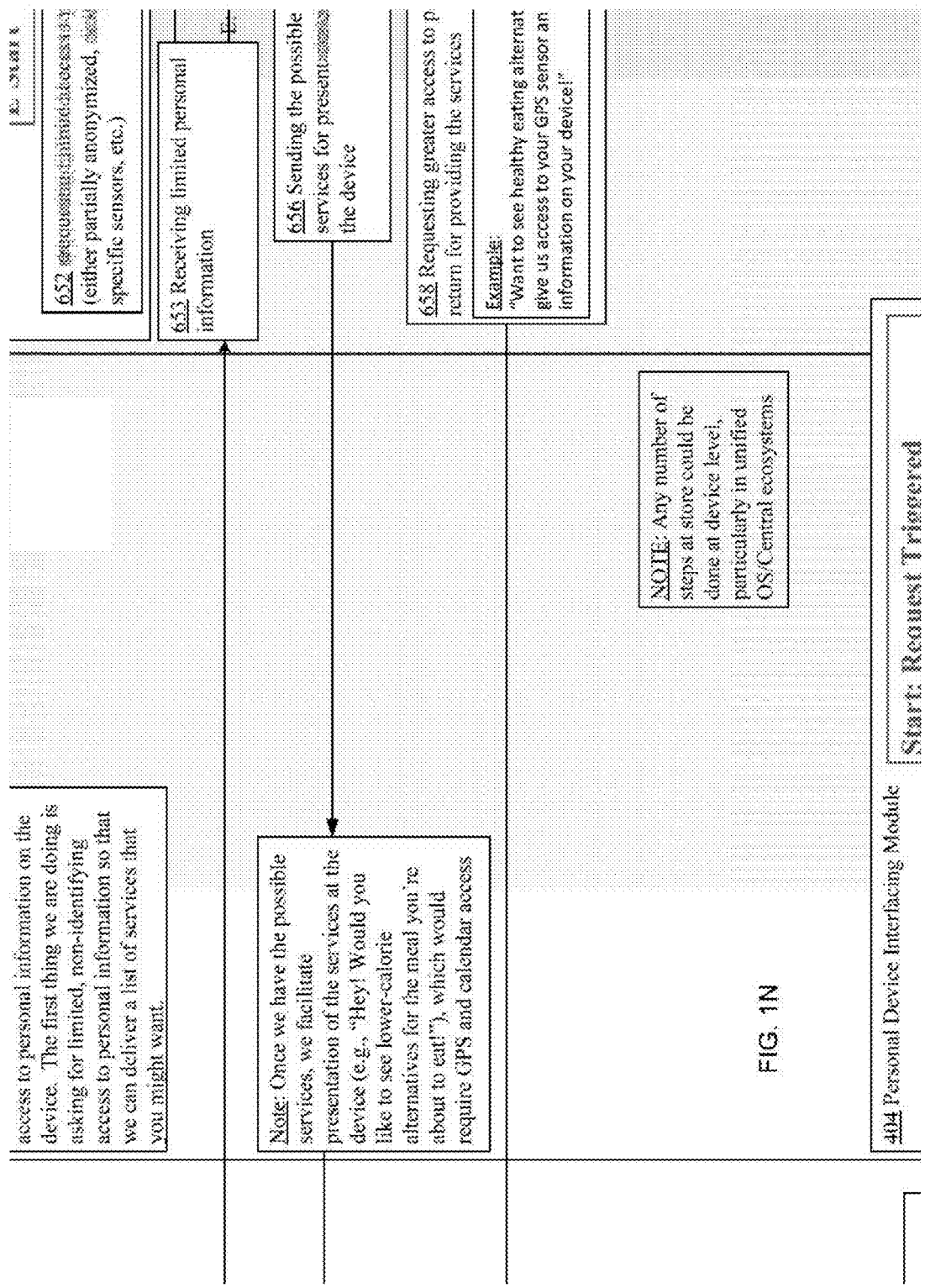

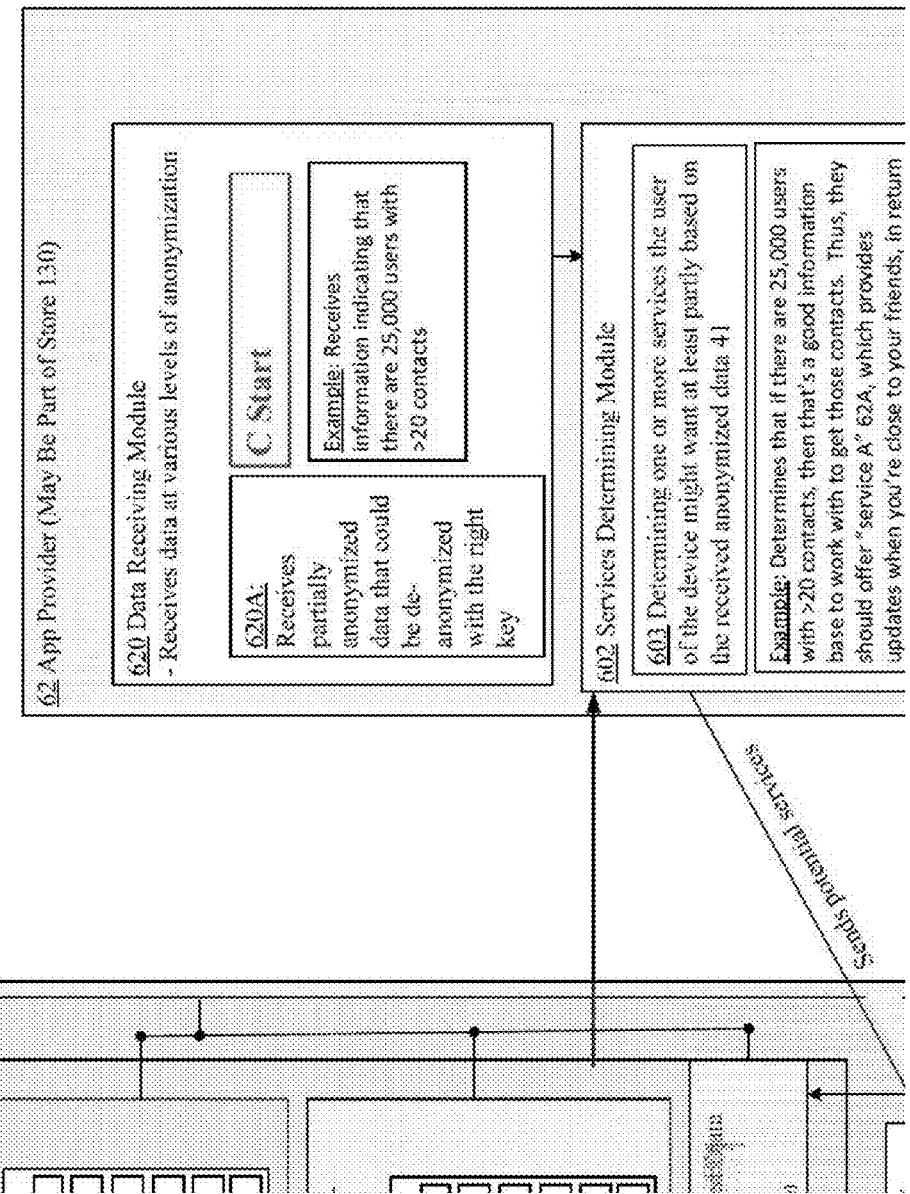

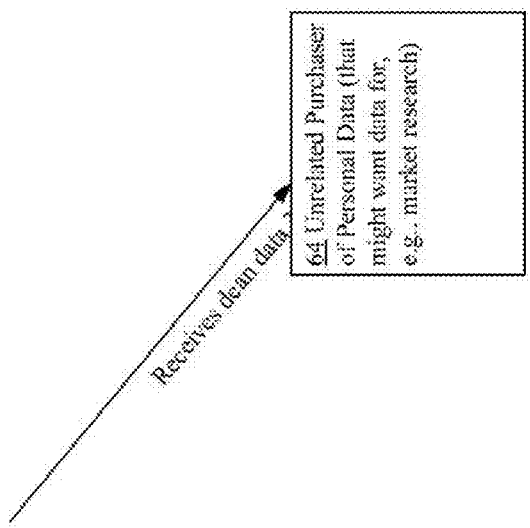
FIG. 1X

METHODS AND SYSTEMS FOR DATA SERVICES

CROSS-REFERENCE TO RELATED APPLICATIONS

If an Application Data Sheet (ADS) has been filed with this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 forms a partially schematic diagram of an environment(s) and/or an implementation(s) of technologies described herein when FIGS. 1A-1X are stitched together in the manner shown in FIG. 1A, which is reproduced below in table format.

TABLE 1

Table showing alignment of enclosed drawings to form partial schematic of one or more environments.

Figure 1A:
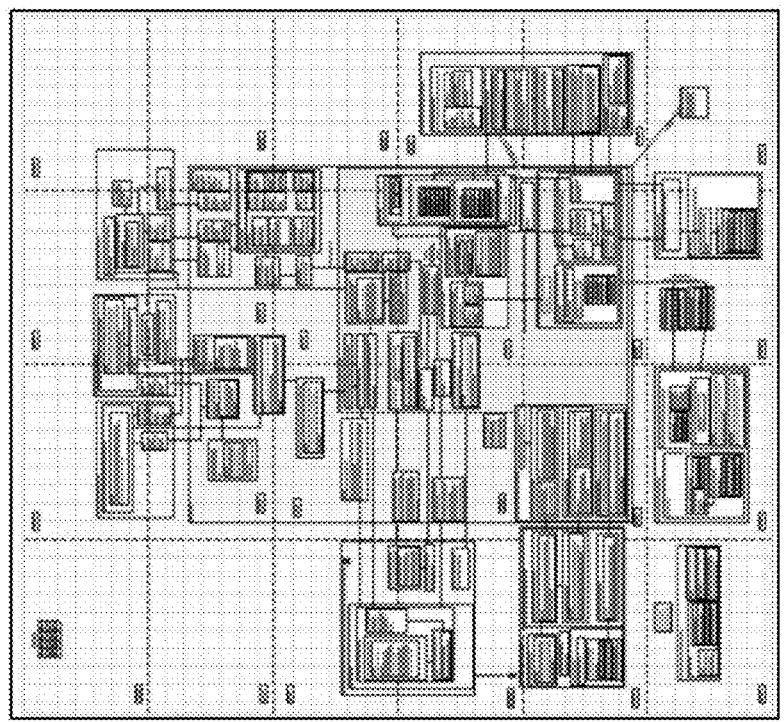
FIGS. 1A-1X, shows a partially schematic diagram of an environment(s) and/or an implementation(s) of technologies described herein.
Figure 1B:
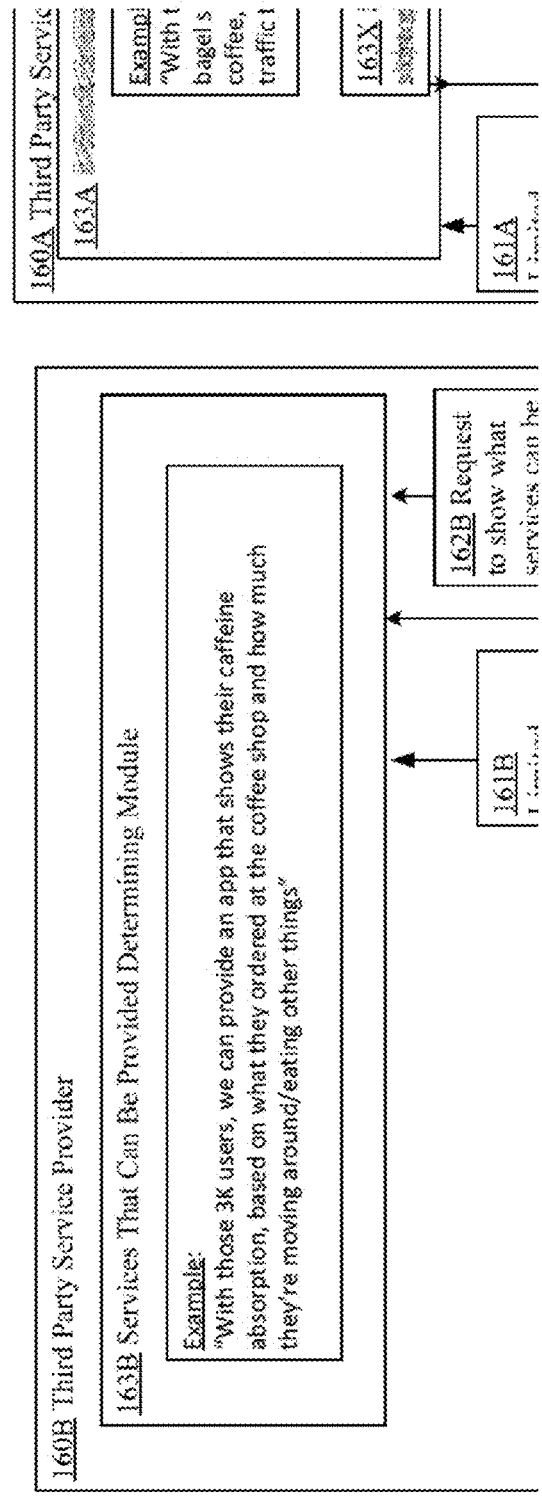
FIG. 1, including
Figure 1C:
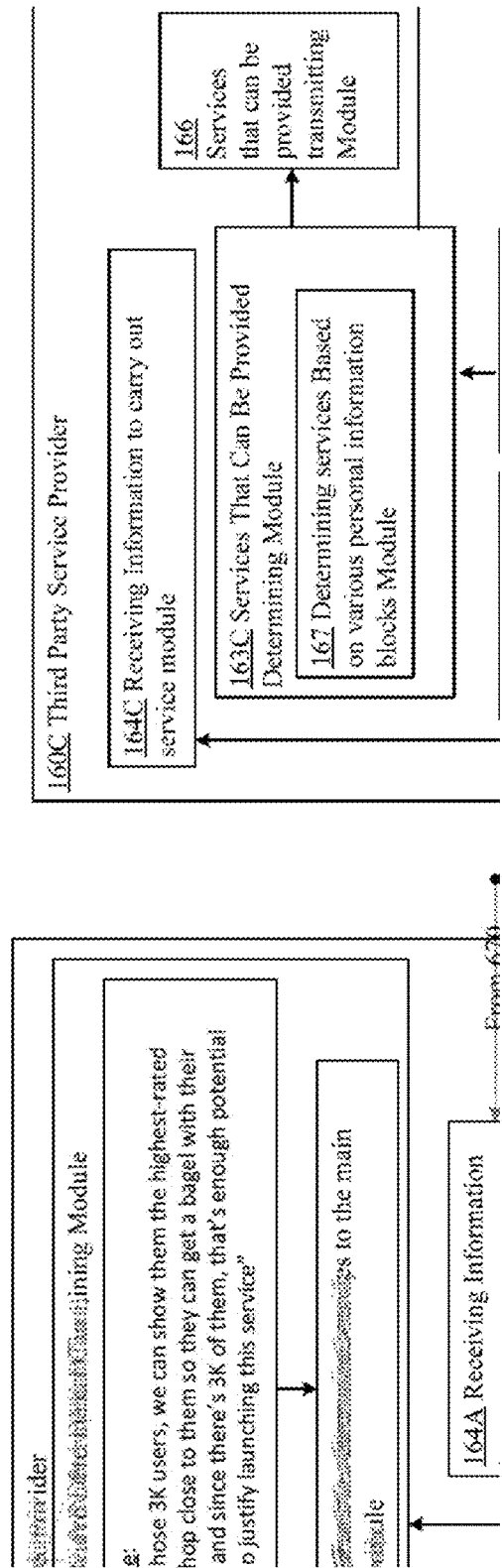
Figure 1F:
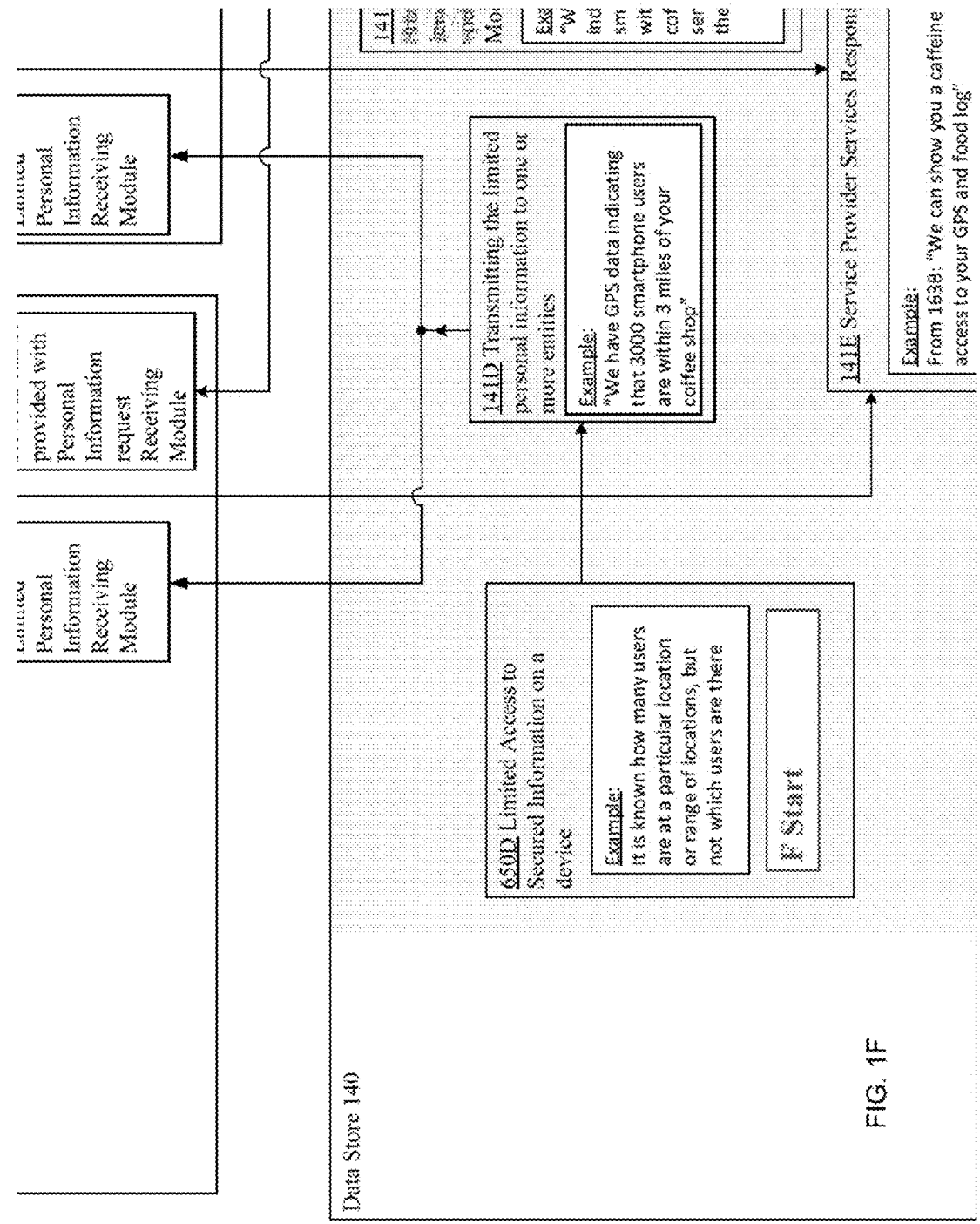
Figure 1G:
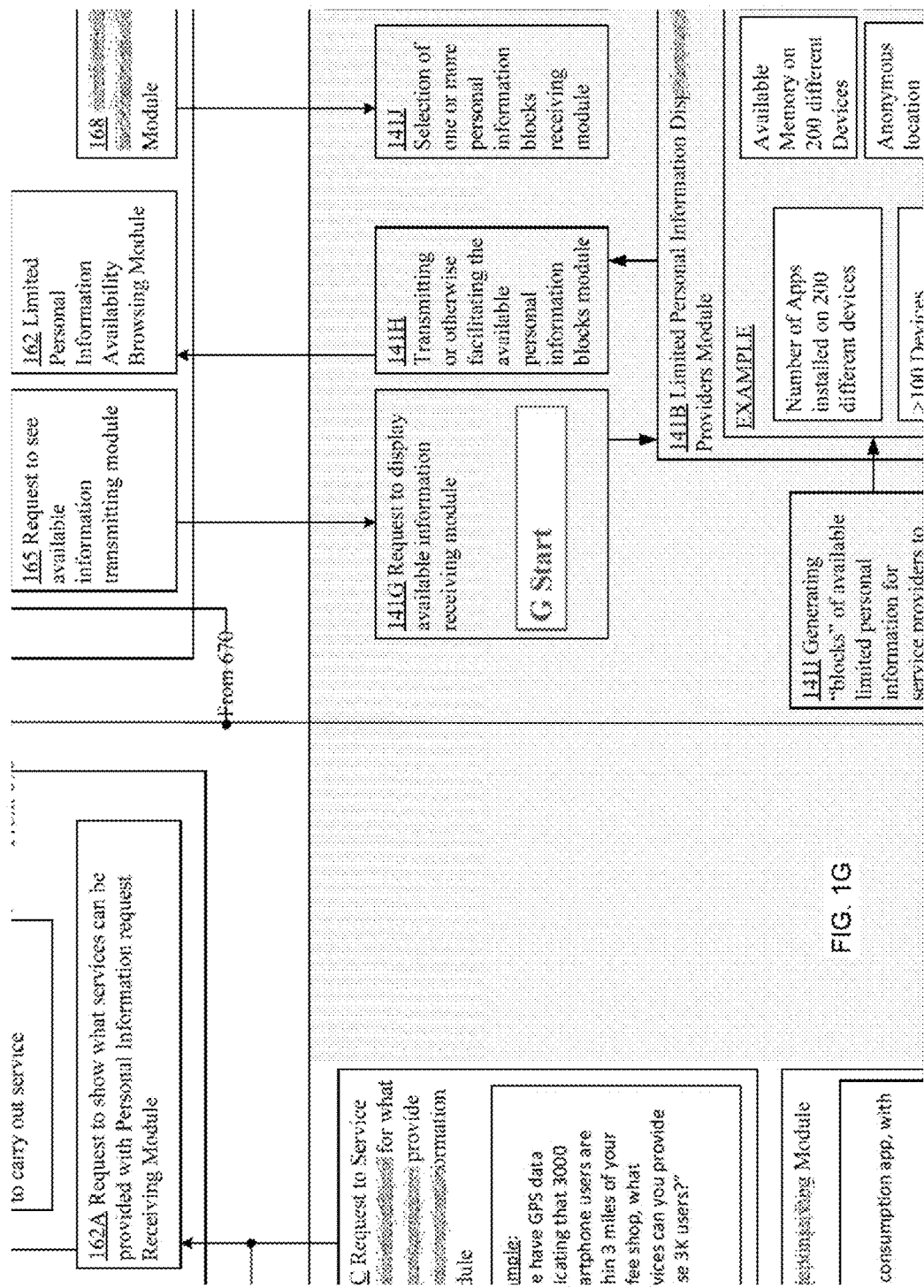
Figure 1H:
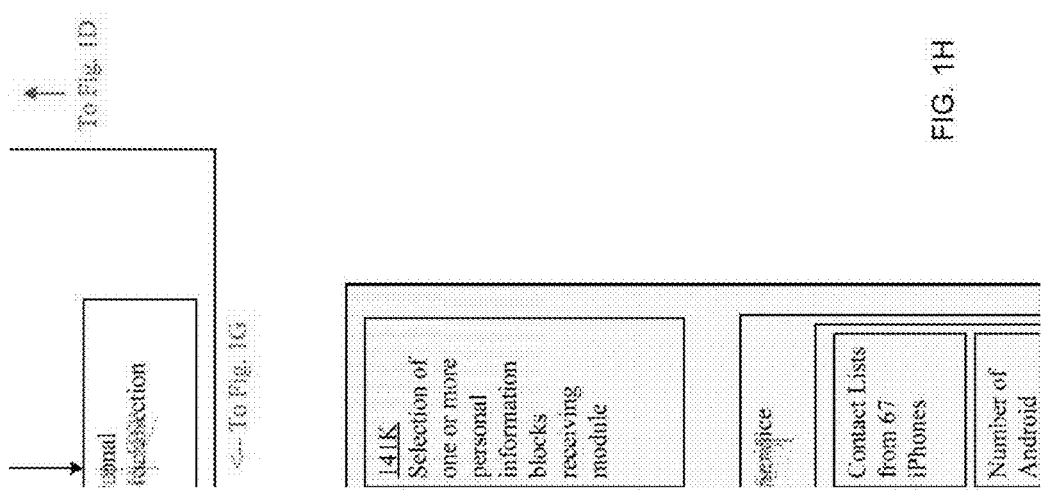
Figure 11:
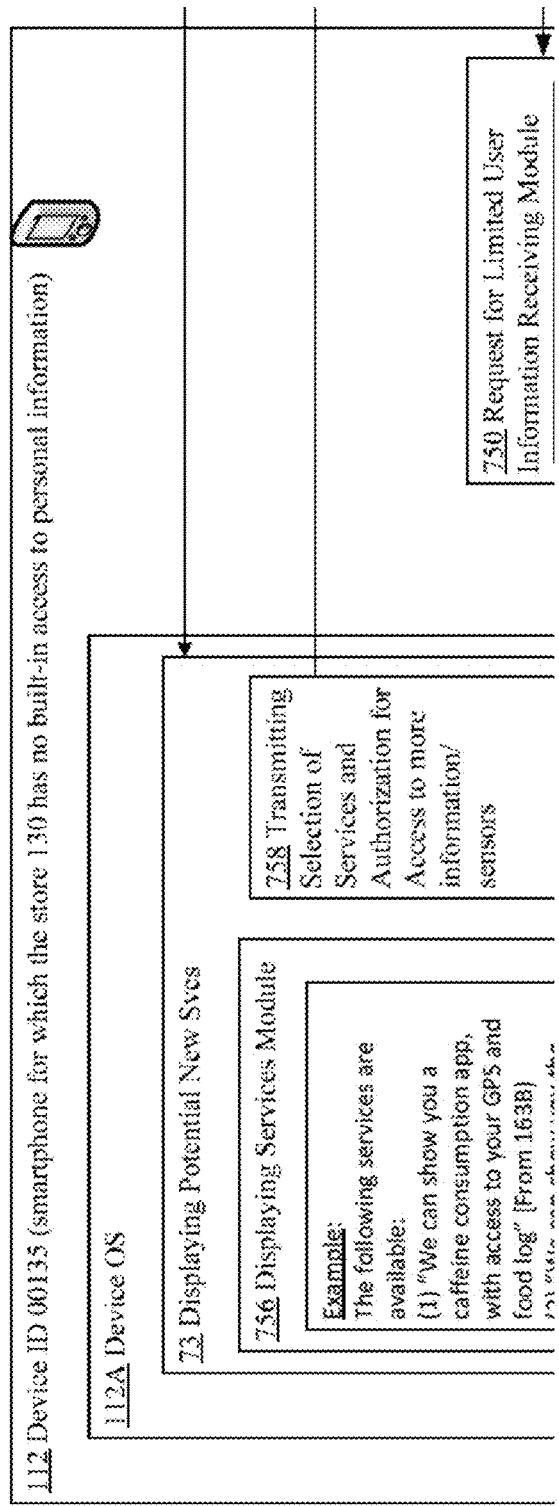
Figure 1L:
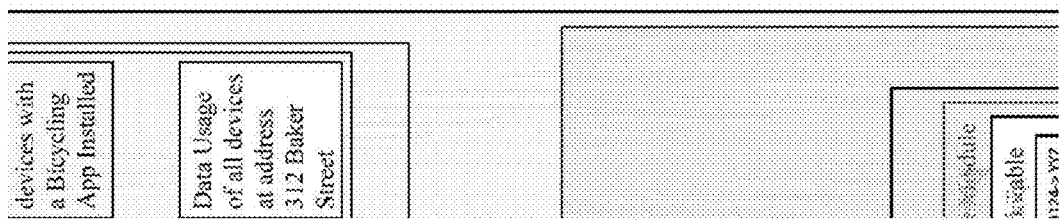
Figure 1M:
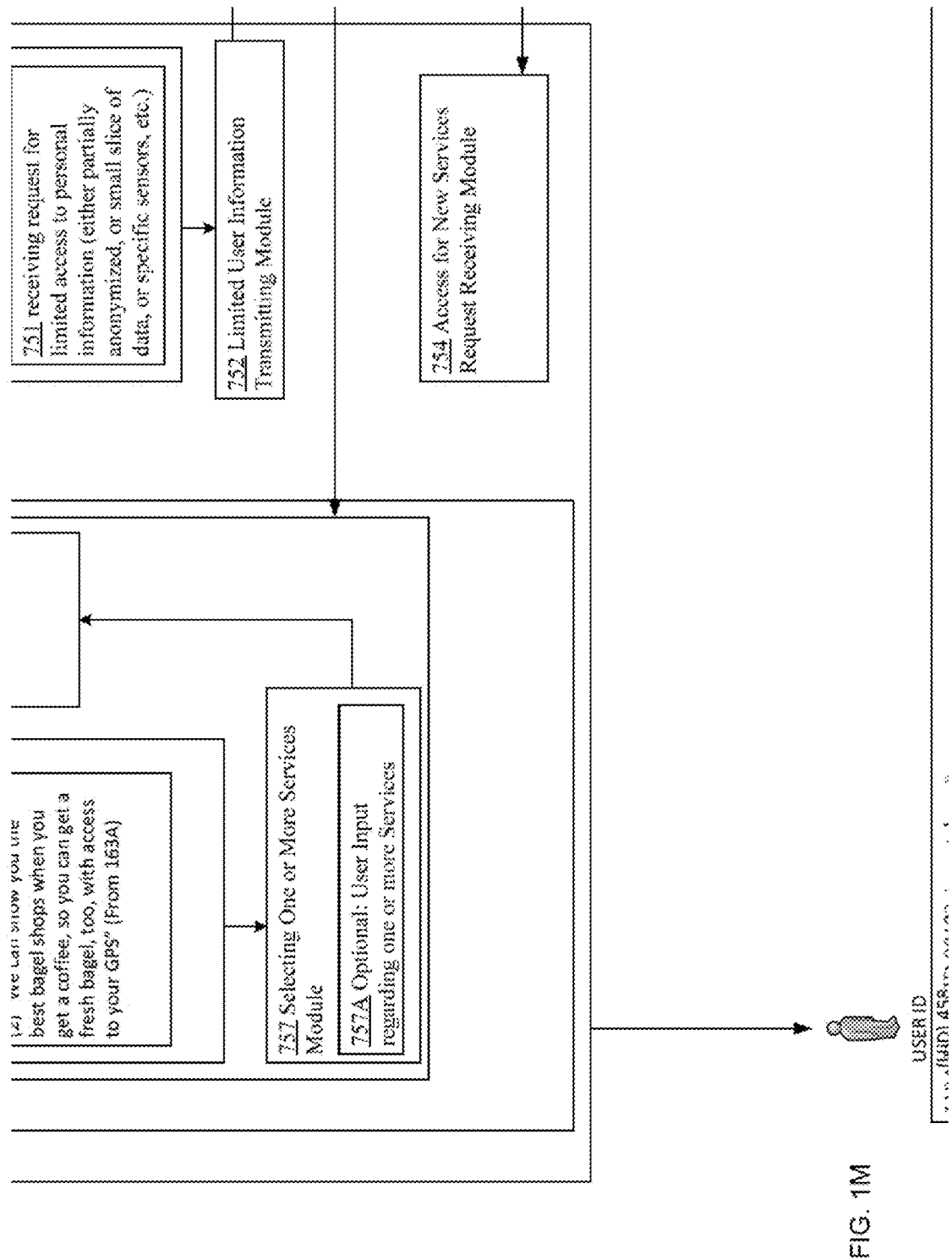
Figure 10:
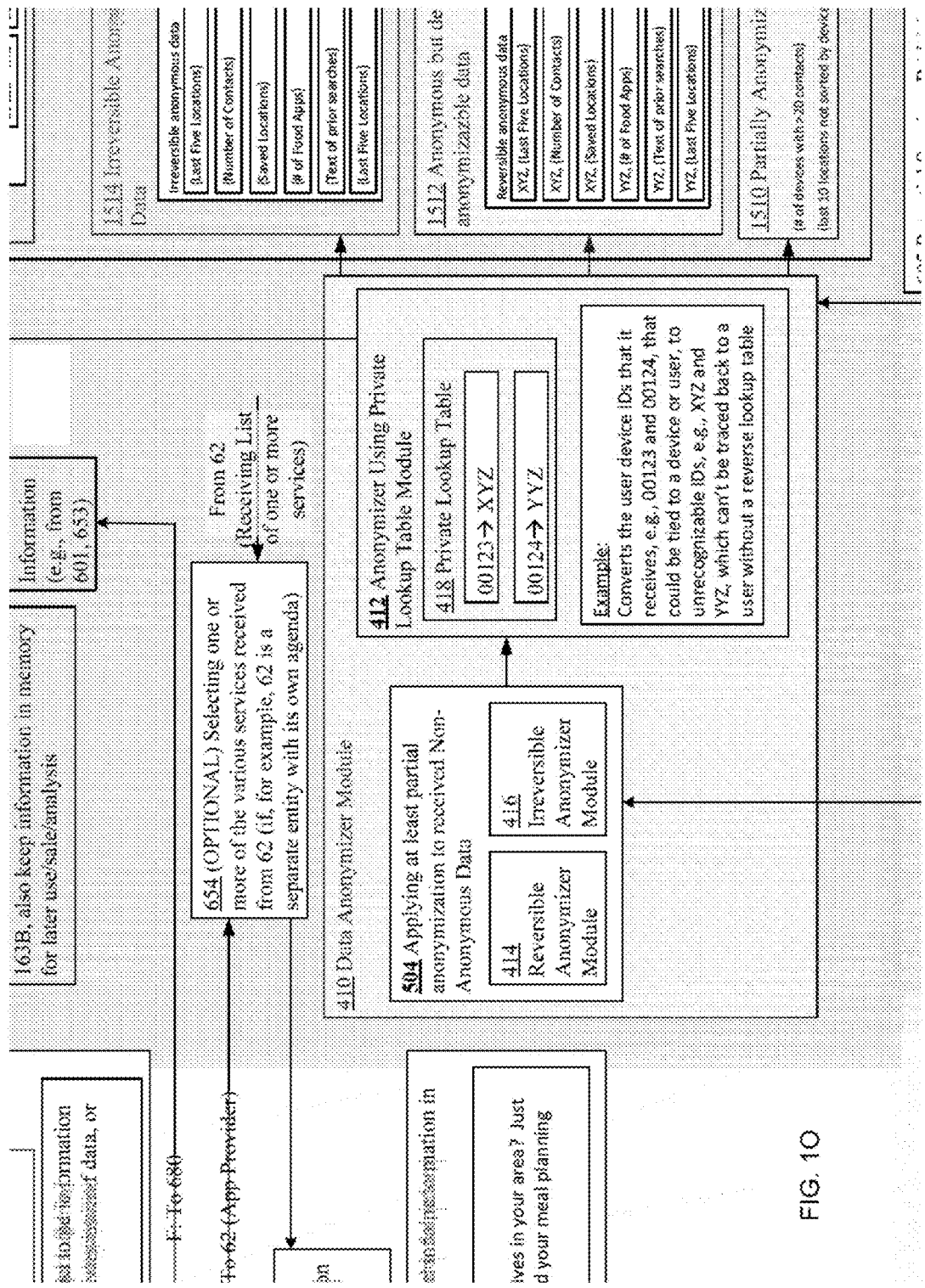
Figure 1Q:
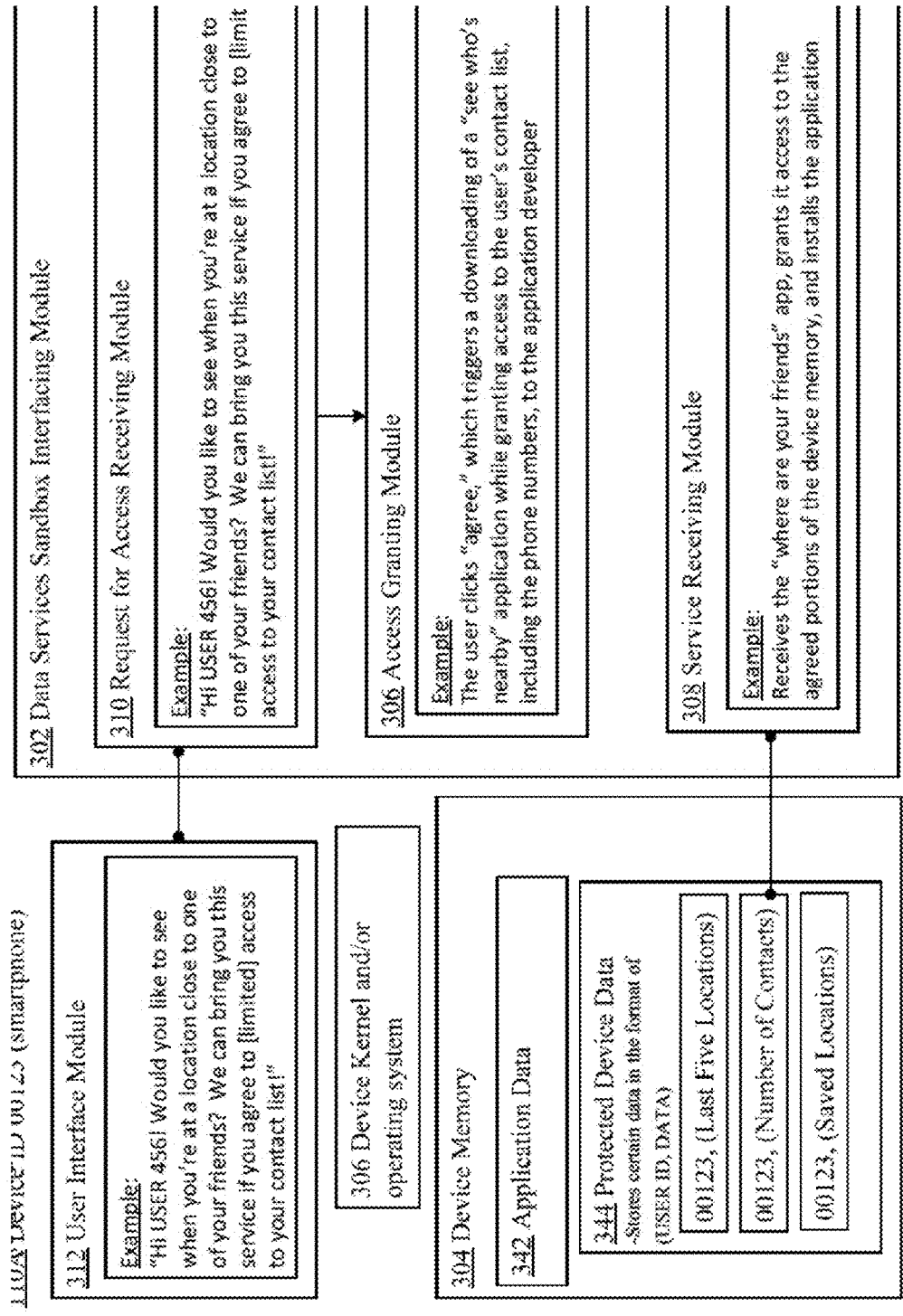
Figure 1R:
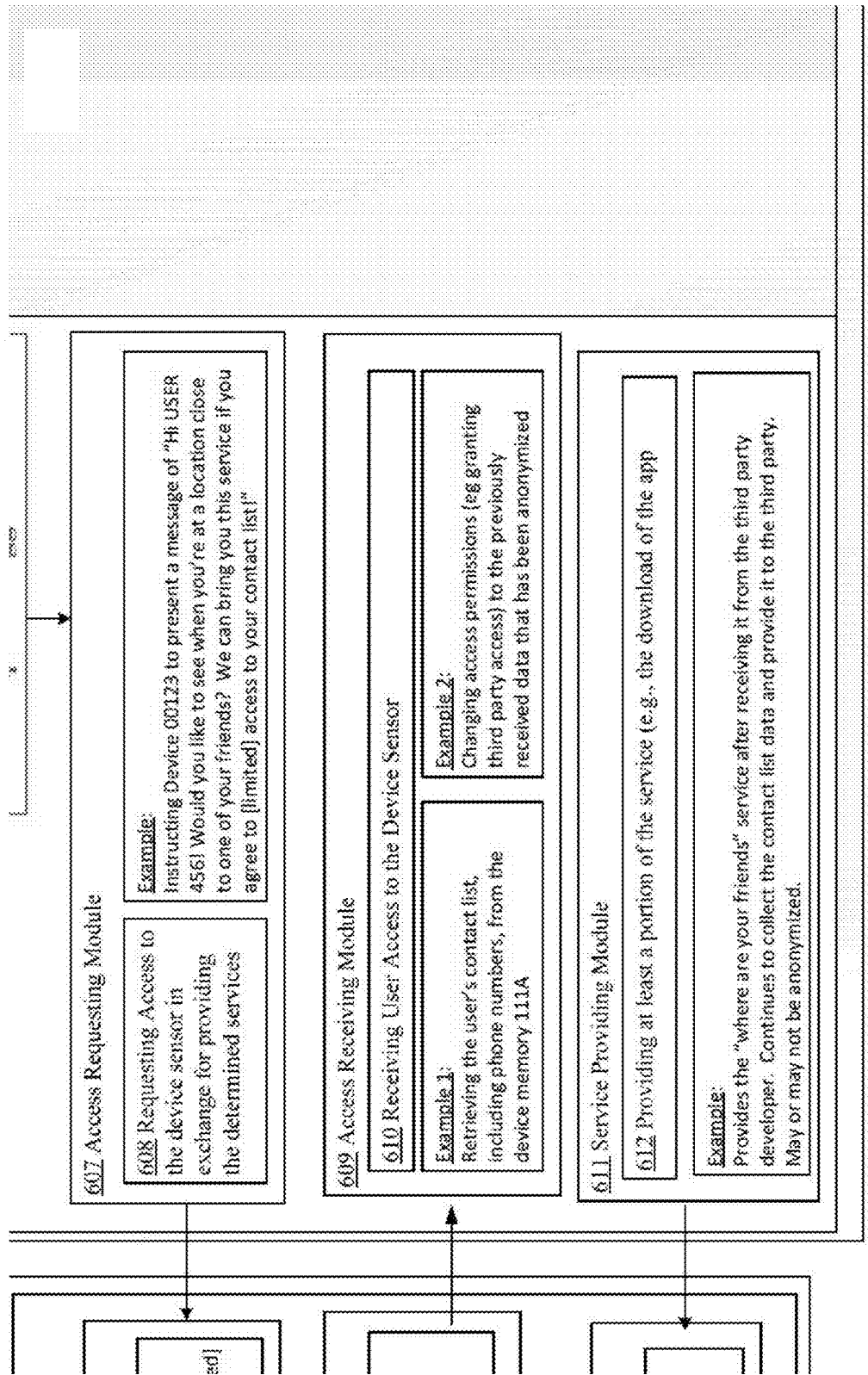
Figure 1S:
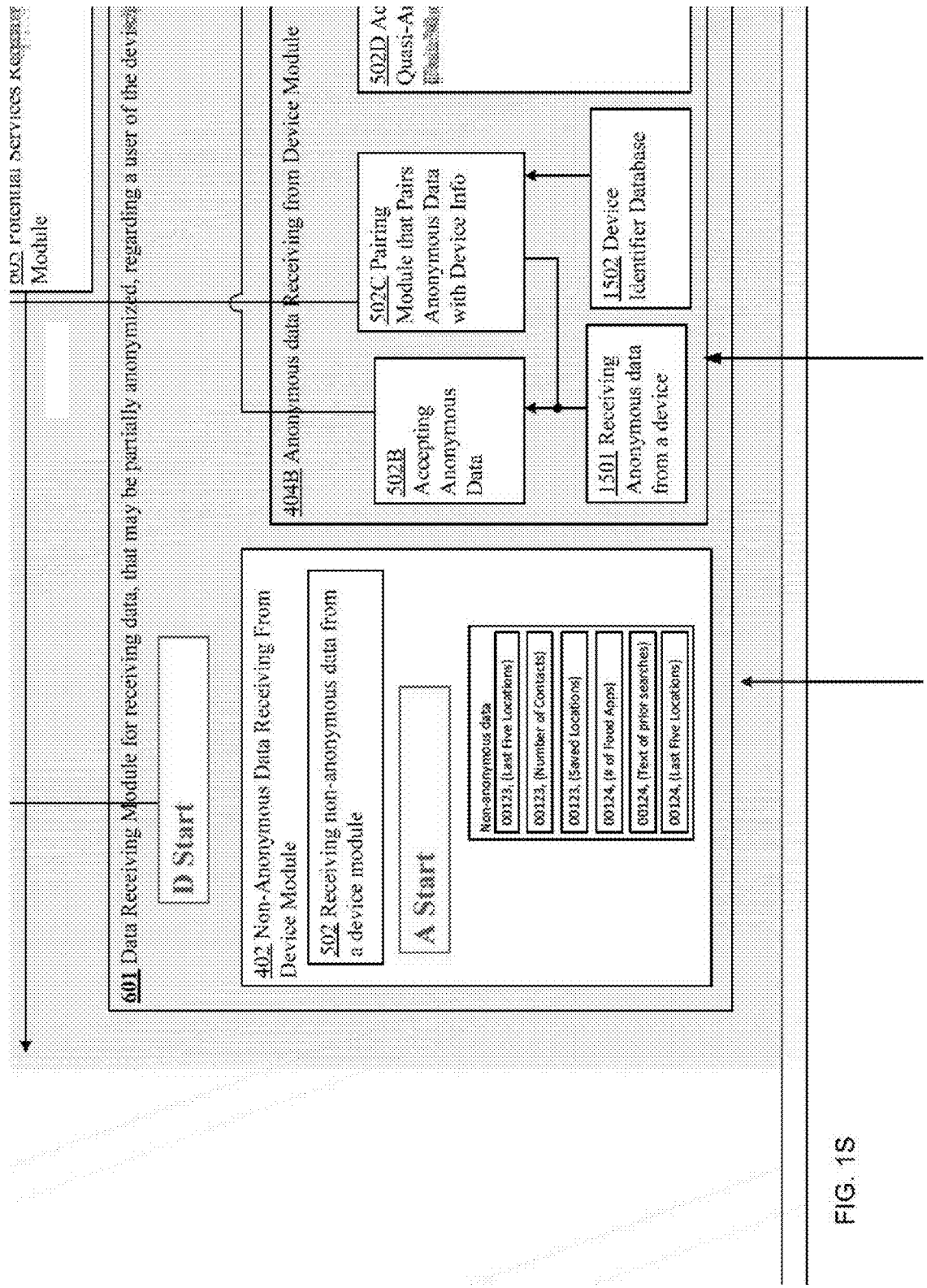
Figure 1T:
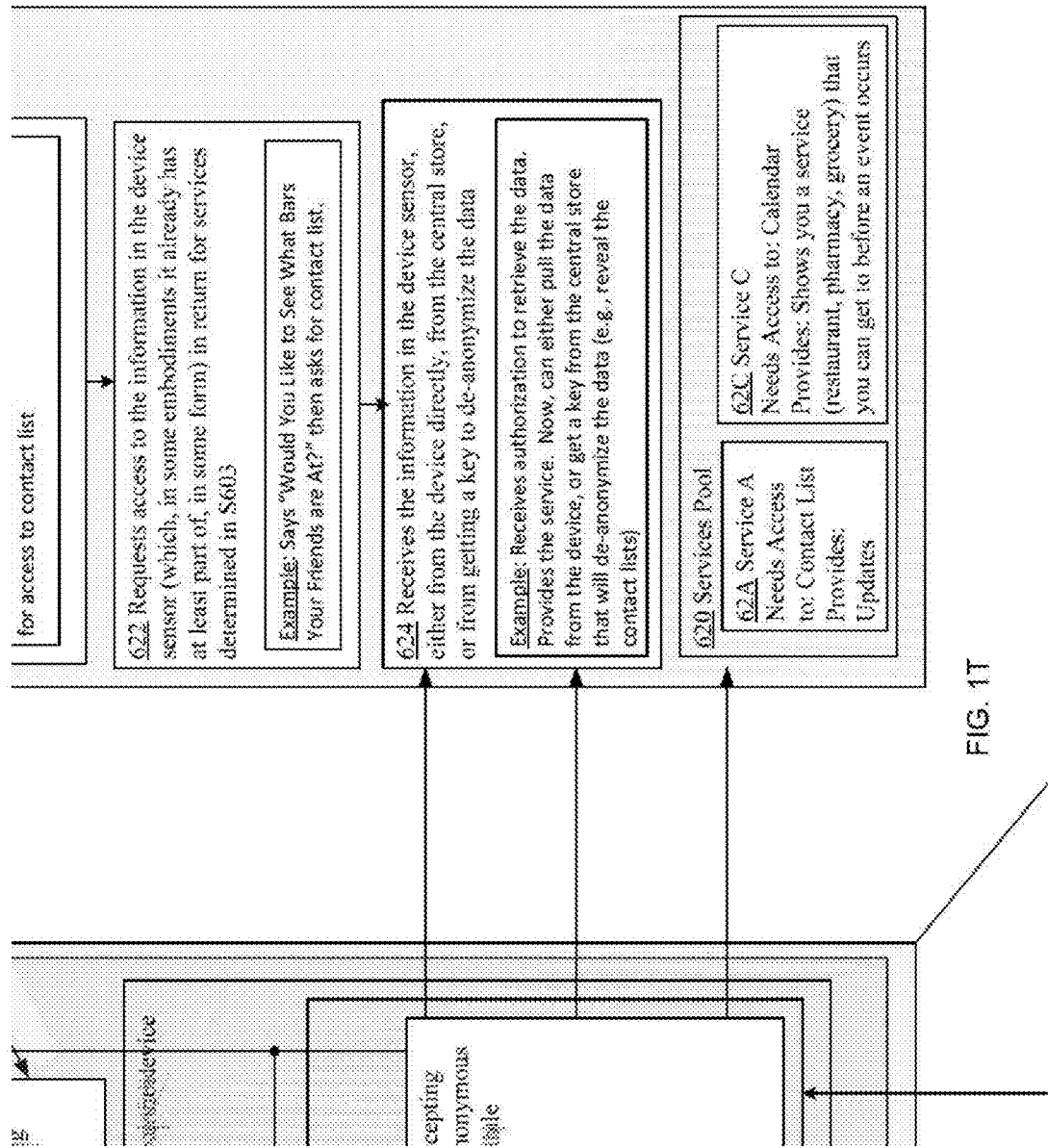
Figure 1U:
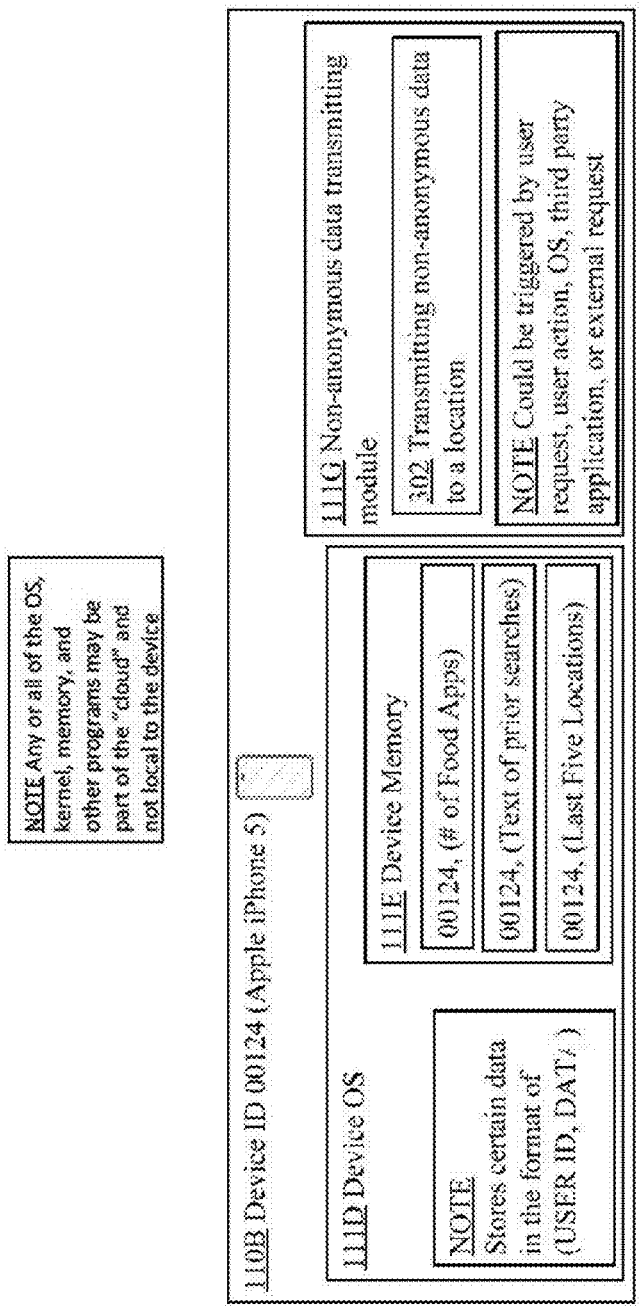
Figure 1V:
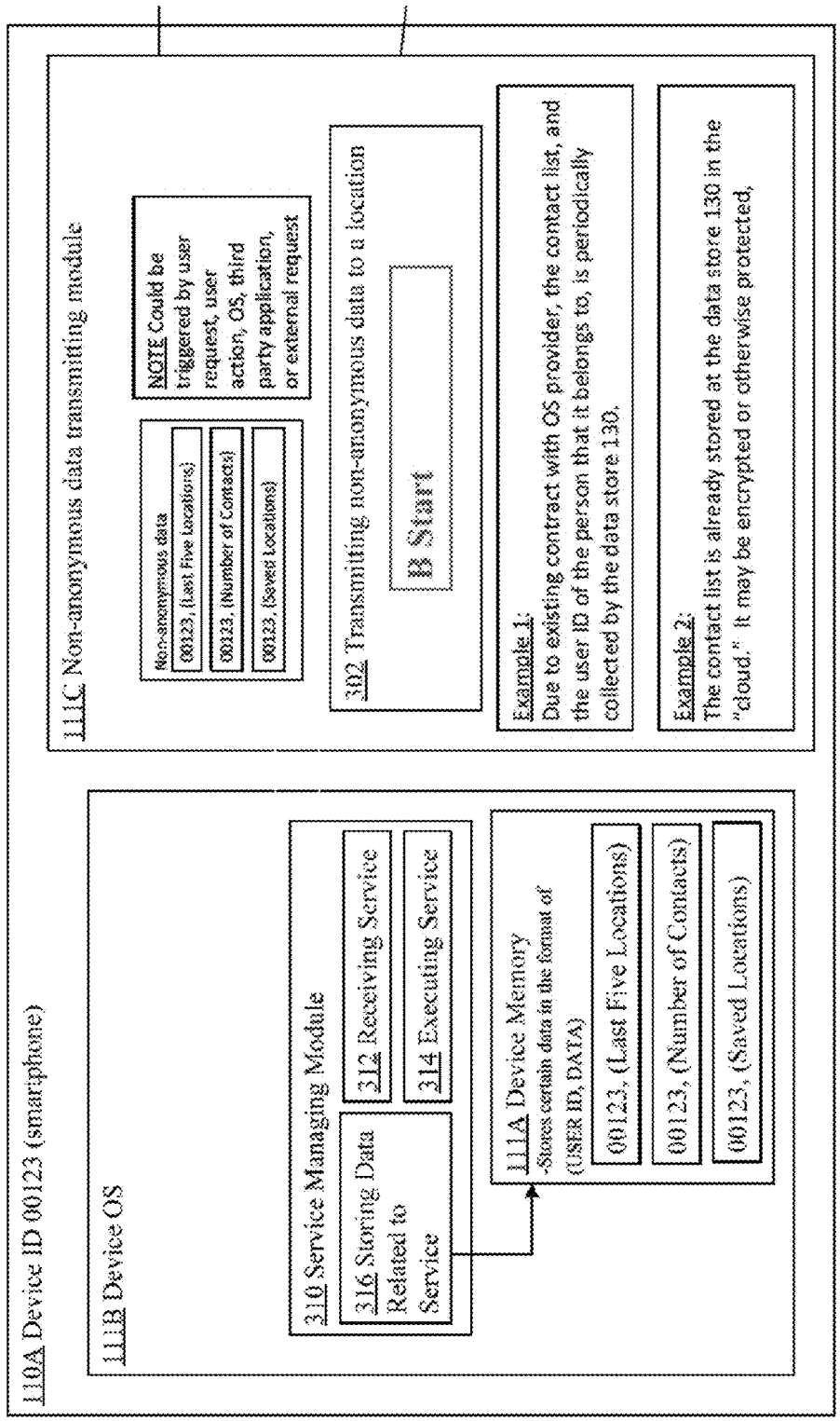
Figure 1W:
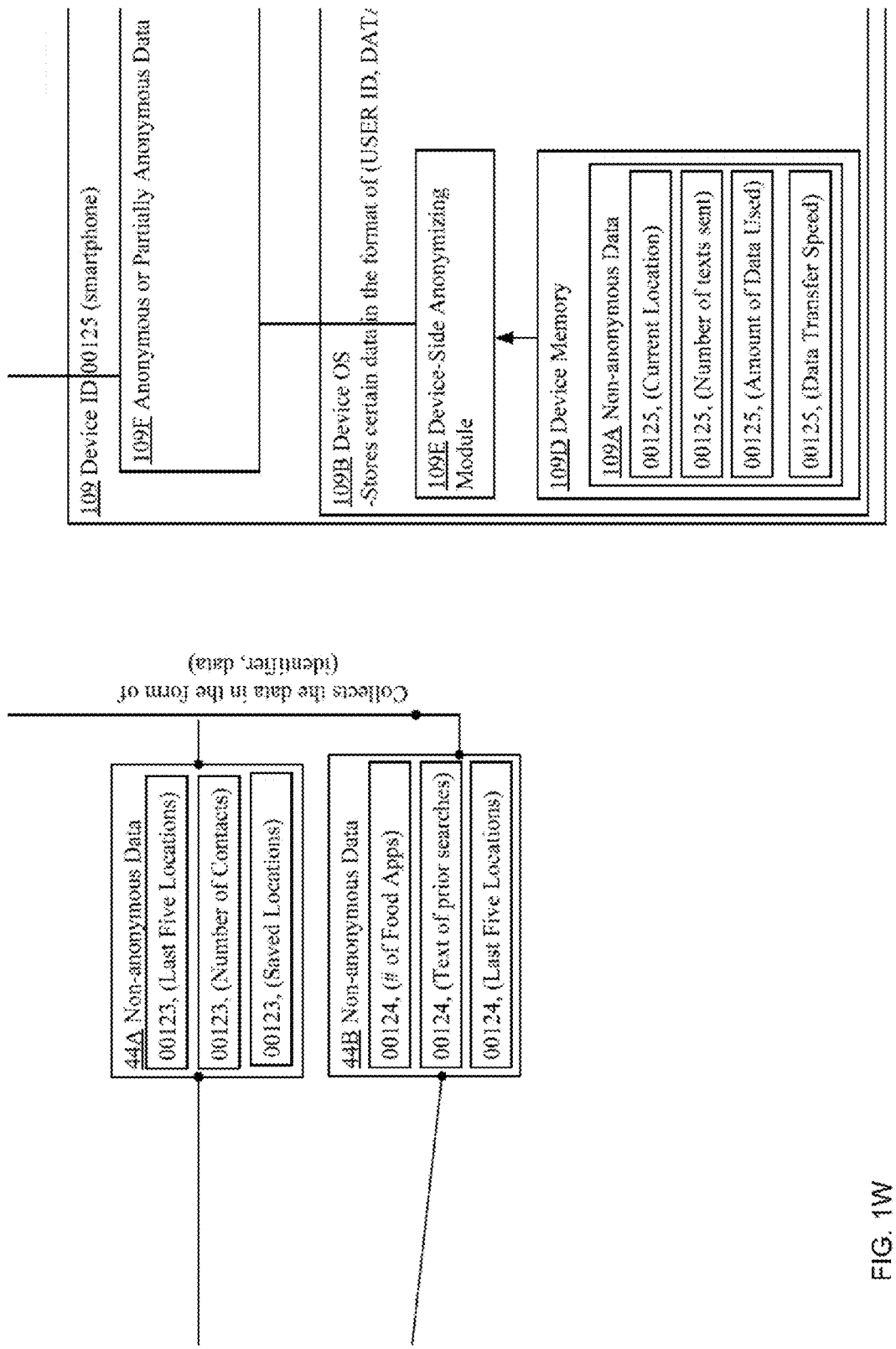

| | | | |
|---|---|---|---|
| (1,1) - FIG. 1A | (1,2) - FIG. 1B | (1,3) - FIG. 1C | (1,4) - FIG. 1D |
| (2,1) - FIG. 1E | (2,2) - FIG. 1F | (2,3) - FIG. 1G | (2,4) - FIG. 1H |
| (3,1) - FIG. 1I | (3,2) - FIG. 1J | (3,3) - FIG. 1K | (3,4) - FIG. 1L |
| (4,1) - FIG. 1M | (4,2) - FIG. 1N | (4,3) - FIG. 1O | (4,4) - FIG. 1P |
| (5,1) - FIG. 1Q | (5,2) - FIG. 1R | (5,3) - FIG. 1S | (5,4) - FIG. 1T |
| (6,1) - FIG. 1U | (6,2) - FIG. 1V | (6,3) - FIG. 1W | (6,4) - FIG. 1X |

FIG. 1A, when placed at position (1,1), forms at least a portion of a partially schematic diagram of an environment(s) and/or an implementation(s) of technologies described herein.

FIG. 1B, when placed at position (1,2), forms at least a portion of a partially schematic diagram of an environment(s) and/or an implementation(s) of technologies described herein.

FIG. 1C, when placed at position (1,3), forms at least a portion of a partially schematic diagram of an environment(s) and/or an implementation(s) of technologies described herein.

FIG. 1D, when placed at position (1,4), forms at least a portion of a partially schematic diagram of an environment(s) and/or an implementation(s) of technologies described herein.

FIG. 1E, when placed at position (2,1), forms at least a portion of a partially schematic diagram of an environment(s) and/or an implementation(s) of technologies described herein.

FIG. 1F, when placed at position (2,2), forms at least a portion of a partially schematic diagram of an environment(s) and/or an implementation(s) of technologies described herein.

FIG. 1G, when placed at position (2,3), forms at least a portion of a partially schematic diagram of an environment(s) and/or an implementation(s) of technologies described herein.

FIG. 1H, when placed at position (2,4), forms at least a portion of a partially schematic diagram of an environment(s) and/or an implementation(s) of technologies described herein.

FIG. 1I, when placed at position (3,1), forms at least a portion of a partially schematic diagram of an environment(s) and/or an implementation(s) of technologies described herein.

FIG. 1J, when placed at position (3,2), forms at least a portion of a partially schematic diagram of an environment(s) and/or an implementation(s) of technologies described herein.

FIG. 1K, when placed at position (3,3), forms at least a portion of a partially schematic diagram of an environment(s) and/or an implementation(s) of technologies described herein.

FIG. 1L, when placed at position (3,4), forms at least a portion of a partially schematic diagram of an environment(s) and/or an implementation(s) of technologies described herein.

FIG. 1M, when placed at position (4,1), forms at least a portion of a partially schematic diagram of an environment(s) and/or an implementation(s) of technologies described herein.

FIG. 1N, when placed at position (4,2), forms at least a portion of a partially schematic diagram of an environment(s) and/or an implementation(s) of technologies described herein.

FIG. 1O, when placed at position (4,3), forms at least a portion of a partially schematic diagram of an environment(s) and/or an implementation(s) of technologies described herein.

FIG. 1P, when placed at position (4,4), forms at least a portion of a partially schematic diagram of an environment(s) and/or an implementation(s) of technologies described herein.

FIG. 1Q, when placed at position (5,1), forms at least a portion of a partially schematic diagram of an environment(s) and/or an implementation(s) of technologies described herein.

FIG. 1R, when placed at position (5,2), forms at least a portion of a partially schematic diagram of an environment(s) and/or an implementation(s) of technologies described herein.

FIG. 1S, when placed at position (5,3), forms at least a portion of a partially schematic diagram of an environment(s) and/or an implementation(s) of technologies described herein.

FIG. 1T, when placed at position (5,4), forms at least a portion of a partially schematic diagram of an environment(s) and/or an implementation(s) of technologies described herein.

FIG. 1U, when placed at position (6,1), forms at least a portion of a partially schematic diagram of an environment(s) and/or an implementation(s) of technologies described herein.

FIG. 1V, when placed at position (6,2), forms at least a portion of a partially schematic diagram of an environment(s) and/or an implementation(s) of technologies described herein.

FIG. 1W, when placed at position (6,3), forms at least a portion of a partially schematic diagram of an environment(s) and/or an implementation(s) of technologies described herein.

FIG. 1X, when placed at position (6,4), forms at least a portion of a partially schematic diagram of an environment(s) and/or an implementation(s) of technologies described herein.

DETAILED DESCRIPTION

Thus, in accordance with various embodiments, computationally implemented methods, systems, circuitry, articles of manufacture, ordered chains of matter, and computer program products are designed to, among other things, provide an interface for acquiring data from a device, said data related to a particular portion of the device, performing one or more operations on the received data to convert the received data into operated data, transmitting the operated data to a data receiving module, acquiring, from a service determining module, one or more services configured to be at least partly carried out by the device, and facilitating presentation of an offer to provide the one or more received services at the device in exchange for access to the particular portion of the device.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around –5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine (s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although user 105 is shown/described herein, e.g., in FIG. 1, and other places, as a single illustrated figure, those skilled in the art will appreciate that user 105 may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In known systems, devices that are associated with one or more users, e.g., phones, tablets, laptops, desktops, cars, game systems, appliances, and the like, may collect data regarding the user. This data may be desired by third parties. The following describes, among other implementations, methods and systems of managing user data collected by one or more devices that may also be useful to entities that are not the user, and which entities may not necessarily have access to the data.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

With reference now to the Figures and with reference now to FIG. 1, FIG. 1 shows a partially schematic diagram of an environment(s) and/or an implementation(s) of technologies described herein. It is noted that FIG. 1 is a high-level environment diagram. As such, some elements of the system of FIG. 1 are expressed through the function they carry out. In such circumstances, these elements should be considered to include any combination of one or more module, hardware, program, microprocessor configuration, state machine, firmware, field-programmable gate array ("FPGA"), application programming interface ("API"), function, class, data structure, dynamically loaded library ("DLL"), database (e.g., SQL database), and the like.

Referring now to FIG. 1, FIG. 1 shows several embodiments of methods and systems for managing data, data ownership, data anonymity, and the like, in a marketplace setting, with access to developers, users, interested third parties, and the like. In some embodiments, one or more devices, e.g., devices 110A and 110B may be in communication with data marketplace 140. In some embodiments, data marketplace 140 may have a preexisting relationship with one or more of devices 110A and 110B. For example, an operator (e.g., a person who has control of at least one component of) data marketplace 140 may also produce operating system applications for devices 110A, 110B, or 110C. In other embodiments, data marketplace 140 and/or its affiliates/controllers does not have a preexisting relationship with devices 110A or 110B.

In some embodiments, data marketplace 140 may include a personal device interfacing module 404. Personal device interfacing module 404 may include access requesting module 607, access receiving module 609, and service providing module 611.

In at least one embodiment, a request for access to data on a device, e.g., a user device 110A, is triggered, either data marketplace 140, or by a third party communicating with data marketplace 140. For example, data marketplace 140 may determine that access to the contact list stored on device 110A is desirable. This request may be triggered by an action of user device 110A, or may be randomly selected, or may be based on some characteristic of user device 110A. Thus, access requesting module 607 may request access to the device sensor in exchange for providing the determined services 608. For example, access requesting module 607 may send a signal to the data services sandbox interfacing module 302 of the device 110A. A request for access receiving module 310 may receive the request, which may be "Hi USER 456 Would you like to see when you're at a location close to one of your friends? We can bring you this service if you agree to [limited] access to your contact list!" Request for access receiving module 310 then communicates with a user interface module 312 of device 11A to display the message. In some embodiments, the device may grant access without this step, for example, if the user has authorized the device to grant such access, or if the device is preconfigured to allow access under particular conditions. The decision may be made by an access granting module 306, which then transmits the grant of access to the user's contact list, which is stored in the device memory 304 as protected device data 344. Access granting module 306 may transmit the grant of access to access receiving module 6019, which receives user access to the device sensor 610. After access is received, service providing module 611 may provide at least a portion of the service 612, e.g., the "find your close friends" application to a service receiving module 308 of data services sandbox interfacing module 302 of device 110A. The providing of the service may include installing the proper components on the device 110A, or performing one or more steps in carrying out the service, or providing the device with the resources needed to carry out the service.

In some embodiments, as shown in FIG. 1, the data marketplace 140 may include, among other limitations, providing authorized information to service provider 670, in addition to providing user information for the service provider 163b, also keep information in memory for later use/sale/analysis 671, optional (if 140/130 not integrated) limited personal information transmitting module 682, received limited personal information (e.g., from 601, 653) 680, optional selecting one or more of the various services received from 62 (if, for example, 62 is a separate entity with its own agenda) 654, a memory 420, and a data anonymizer module 410.

In some embodiments, data anonymizer module 410 may include applying at least partial anonymization to received non-anonymous data 504. In some embodiments, applying at least partial anonymization to received non-anonymous data 504 may include reversible anonymizer module 414 and irreversible anonymizer module 416. In some embodiments, data anonymizer module 410 may include anonymizer using private lookup table module 412, which, in some embodiments, may include private lookup table 418.

In some embodiments, memory 420 may include one or more of lookup table storage module 422, private lookup table module 418, irreversible anonymized data 1514, anonymous but de-anonymizable data 1512, and partially anonymized data 1510.

In some embodiments, data marketplace 140 may further include access requesting module 607, access receiving module 609, and service providing module 611. Access receiving module 609 may include receiving user access to the device sensor 610. Service providing module 611 may include providing at least a portion of the service 612.

In some embodiments, data marketplace 140 may further include Data Receiving Module for receiving data, that may be partially anonymized, regarding a user of the device or the device 601. In some embodiments, module 601 may include one or more of non-anonymous data receiving from device module 402 and anonymous data receiving from device module 404B. In some embodiments, module 402 may include receiving non-anonymous data from a device module 502. In some embodiments, module 404B may include receiving anonymous data from a device 1501, accepting anonymous data 502B, pairing module that pairs anonymous data with device info 502C, device identifier database 1502, and accepting quasi-anonymous data module 502D. In some embodiments, data marketplace 140 may further include potential services receiving module 605.

Referring again to FIG. 1, various embodiments may include one or more third party service providers, e.g., third party service provider 160A and third party service provider 160B. In some embodiments, third party service provider 160A may receive authorized information transmitted from module 670 of the data marketplace 140. In some embodiments, third party service provider 160A may include receiving information to carry out service module 164A, services that can be provided determining module 163A, limited personal information receiving module 161A, and request to show what services can be provided with personal information request receiving module 162A. In some embodiments, module 163A may include sending the determined services back to the main store module 163X. In some embodiments, third party service provider 160B may include services that can be provided determining module 163B, limited personal information receiving module 161B, and request to show what services can be provided with personal information request receiving module 162B.

Referring again to FIG. 1, various embodiments may include a third party service provider 160C. In some embodiments, third party service provider 160C may receive authorized information transmitted from module 670 of the data marketplace 140. In some embodiments, third party service provider 160C may include receiving information to carry out service module 164C, services that can be provided determining module 163C, services that can be provided transmitting module 166, request to show what services can be provided with personal information request receiving module 162C, request to see available information transmitting module 165, limited personal information availability browsing module 162, and limited personal information block selection module 168. In some embodiments, module 163C may include determining services based on various personal information blocks module 167.

Referring again to FIG. 1, in some embodiments, there may be a sandboxed data exchange module. In some embodiments, module 102 may provide a market for data by showing what data is available to third party developers, and may provide a venue for third party developers to request different types of data, or to gauge what data is available for them to design applications around. In some embodiments, module 102 may include selling data a and data b to application developer module 224, asking App2 and App3 for Data A and Data B in return for cash or a profit share in C module 203B, detecting that AppDev2 has Data A and AppDev3 has Data B, a database 222 that tracks which developers and/or applications have which data, a receiving request for Data A and Data B module 201, and finding devices that have already granted access to Data A and Data B to different applications 203A.

In some embodiments, data marketplace 140 may include one or more modules or other implementations of limited access to secured information on a device 650D, transmitting the limited personal information to one or more entities 141D, request to service providers module 141C, service provider services response receiving module 141E, and data-store side services selecting module 141F. Specifically, the data marketplace 140 may communicate with third party developers, e.g., third party developers 160A and 160B, as previously described. In some embodiments, data marketplace 140 may receive possible services from the third party developers. In some embodiments, some selection or filtering of services may take place at data marketplace 140.

In some embodiments, data marketplace 140 may generate a "store" showing what personal information is available from devices to developers. This store, e.g., limited personal information displaying to service providers module 141B may provide various options for third parties to view what type of data is available, as shown in the examples in 141B. Some of those examples of data may be free to view, others may have a profit-sharing arrangement, and still others might have an upfront cost.

In some embodiments, data marketplace 140 may include limited personal information receiving module 141A and generating module 141I that generates blocks of available limited personal information. These modules may receive data from devices or from data marketplace 140. Data marketplace 140 also may include a request to display available information receiving module 141G, transmitting or otherwise facilitating the available personal information blocks module 141H, selection of one or more personal information blocks receiving module 141J, and selection of one or more personal information blocks receiving module 141K, which may communicate with one or more telecom providers 105 as previously described. Modules 141G, 141H and 141J may communicate with third party developers to facilitate display and selection of services from the store generated by 141B.

As shown in FIG. 1, some embodiments may include a device, e.g., device 118. Device 118 may have a device operating system 118A. In some embodiments, device operating system 118A may include hardware, program, firmware, APIs, or any combination of the above. Device operating system 118A may display potential new services 73. Device operating system 118A may include a displaying services module 756, selecting one or more services module 757 (e.g., which, in some embodiments, may use user input 757A from user 458), and transmitting module 758 that transmits selection of services and authorization for access to more information and/or sensors. Device 118 also may include request for limited user information receiving module 750 that receives a request 751 from the data marketplace 140, said request including limited access to personal information. Device 118 also may include limited user information transmitting module 752, and access for new services request receiving module 754.

Referring to FIG. 1, in some embodiments, when an application provider 62 is separate from data marketplace 140, then services module 640 may interface between the application providers 62 (which will be discussed in more detail herein) and the previously-described data marketplace 140. For example, services module 640 may include showing module 642 that shows the partially-anonymized data to one or more app providers that have a services pool (e.g., application provider 62) and partially anonymized data providing module 646, which may provide (e.g., transmit) partially anonymized data to a third party application provider. In some embodiments, module 642 may include price setting module 644 and seeing services module 645 that lest the third parties show what services they could provide for the data.

Referring again to FIG. 1, in some embodiments, there may be non-anonymization devices 110, e.g., device 110A and device 110B. In some embodiments, these devices do not handle data anonymization, but merely transmit data to the data marketplace 140, and the devices may have an agreement with the data marketplace 140 to anonymize the data, or the data marketplace 140 may provide anonymization without explicit authorization from the devices. Device 110A, for example, may include a request for access receiving module 304. The request for access receiving module 304 may include receiving a list of services and/or an access request 305, or receiving a specific service or access request 307. The device 110A also may include an access granting module 306 and a service receiving module 308, which communicate with data marketplace 140 to grant access to information or sensors, and receive the service, respectively. Device 110A also may include, in some embodiments, a device OS 111B including a service managing module 310, a device memory 111A, a storing data related to service module 316, receiving service 312 and executing service 314. Device OS 11B may communicate with, or include as part of itself, a non-anonymous data transmitting module 111C. Module 111C may transmit non-anonymous data to a location 302.

Similarly, in some embodiments, a device 110B may include a device OS 111D, a device memory 111E, a non-anonymous data transmitting module 111G that transmits non-anonymous data 302 to a location. As shown in FIG. 1, device 110B may similarly transmit data that has not been anonymized, e.g., that can be used to identify the device, to the data marketplace 140.

Referring again to FIG. 1, in some embodiments, app provider 62 may be part of data marketplace 140, or may be a separate entity from data marketplace 140. App provider 62 may include a data receiving module that receives the data from the devices directly, or after it has been anonymized from the data marketplace 140. App provider 62 may include services determining module 602, access requesting module 622, information receiving module 624, and services pool 620. Services pool 620 may include service 62A, which needs access to a contact list, and provides updates when the device is close to other devices on the contact list, service 62B, which needs access to GPS sensors, and provides healthy restaurant alternatives based on the device location, and service 62C, which needs access to the calendar on the device and provides a service of showing the user places that the user can get into and out of in time for the user to be on time for his or her next event in the calendar.

Referring again to FIG. 1, in some embodiments, there may be a device 109 that handles data anonymization on the device side. Specifically, device 109 may include a device OS 109B that includes a device memory 109D and a device-side anonymizing module 109E that takes the data from device memory 109D and anoynymizes it. The data is then transmitted to module 109F, which transmits the anonymous or partially anonymous data to data marketplace 140. In some embodiments, anonymization is provided at both the device side and at the store side, and in some embodiments, a portion of the anonymization is carried out at both the store side and the device side, and the combination results in anonymous data.

Thus, in the embodiments described above, a marketplace is created for access to a user's data, and services that might be provided in exchange for that access. In that marketplace, users, developers, third party providers, telecoms, and other entities may exchange services and access in a marketplace where identity and access is protected, but information about availability is facilitated. The exemplary embodiment describing access to a user's contact list in exchange for an application that will alert when friends are close is just one of many varied implementations and interactions that may take place. In addition, third party service providers may interact with the data, for which access is managed by the data marketplace 140, in any various ways, which are not all described in detail previously. An example is given in the example interface within limited personal information module 141B communicating with the third party provider, as described in more detail previously.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

In some embodiments, a method includes receiving at least partially anonymized data regarding [a user of] the device [601], determine one or more services [the user of] the device might want at least partly based on the received partially anonymized data [603], requesting access to the device sensor of the device in exchange for providing the one or more determined services [608], receiving access to the device sensor, [610] and providing at least a portion of the one or more services [could be as simple as downloading an app] [612].

In some embodiments, a method includes transmitting at least partially anonymized data regarding [a user of] the device [302], receiving a list of one or more services [the user of] that could be provided at least partly based on the data not previously transmitted but configured to be collected [304/305], receiving a request for access to the data in return for providing one or more of the services [304/307], providing access to the data [306], and receiving at least a portion of the one or more services [could be as simple as receiving an app that can run the services] [308].

In some embodiments, a method includes receiving encrypted anonymized data that could be un-anonymized if the correct key was received [620A], reading limited portions of the encrypted data to determine one or more services the user might want [603], requesting access to the device sensor of a user in exchange for providing services [622], and receiving the "unlock" key to unlock the rest of the data in return for providing the one or more services [624].

In some embodiments, a method includes collecting data including at least one set of a user ID and at least one piece of information regarding the user [for example, a set of (user 34024, GPS log)] [601], for each of the data collected, anonymizing the data by replacing the user ID with generic information [or deleting the information all together] [the generic information could be like (male, GPS log) male 02654], or (male age 34, GPS log), taken from information (user 34204, GPS log)] [504], creating a non-recoverable key table [e.g., using encryption, private/public key, etc.] configured to convert the generic information back into personally-identifiable data and [412] making the anonymized data available to third parties to determine whether the third party has one or more services to provide to the user, [either individually or collectively] [640/644] OR transmitting the anonymized data to a third party who may be interested in providing services to the device [640/646].

In some embodiments, a method includes requesting limited access to personal information [e.g. location data] in return for figuring out what services are wanted [650/652], determining what services might be wanted [based on the limited access to personal information] [654/65], facilitating presentation of the services at a device [656/73], and requesting greater access to personal information in return for providing the services [658].

In some embodiments, a method includes having limited access to personal information (including location data) [650D/652], transmitting the limited personal information to one or more entities configured to provide one or more services [141D], requesting that one or more entities show what services they could provide in return for access to the data [perhaps inherently "showing third parties the limited personal information"] [141C], selecting one or more of the third party services based on one or more factors [141F], showing the third party services to the user and letting him select one (possibly with some filtering), but the selection gives A the right to get the data and give it to the third party, [684], and giving the data to the third party (and possibly keeping it for themselves) [670].

In some embodiments, a method includes receiving a request to display available personal information blocks [141G], facilitating presentation of one or more available personal information blocks [141B], receiving a selection of the one or more available personal information blocks [141-J] and giving the data to the third party (and possibly keeping it for themselves).

In some embodiments, a method includes monitoring a set of activities carried out by a user of a device [This assumes we already have the limited access baked in] [251], retrieving information about capabilities of the device [252], presenting, at a relevant time, the device with one or more activities that the device could do at least partly based on the activities and partly based on the capabilities of the device, wherein said one or more activities could be carried out with access to one or more pieces of information and [253], and requesting access to the one or more pieces of information in exchange for carrying out the one or more activities. [254]

In some embodiments, a method includes detecting one or more device sensors to which access is restricted (e.g., doesn't have to be denied, could be just restricted) [231], determining a service that would require usage of the device sensor (this could be based on just about anything) [232B], presenting a request for access to the device sensor to the user [234] and receiving permission to access the device sensor to which access is restricted [235/108Q].

In some embodiments, a method includes detecting that access is given to one or more applications to one or more device sensors to provide one or more services [221], detecting that the one or more services are completed and the device still has access to the one or more device sensors [222], and informing the user that the one or more services are completed and asking if the user wants to continue granting access, knowing that the service will be discontinued if the access is cut off [223]. Optionally, if the user says no, presenting more services that the user might want [224].

In some embodiments, a method includes detecting, based on data transmitted over a network, one or more services a user might want [802], determining if there are any third parties that want access to the data transmitted over the network [804A], suggesting services in exchange for getting to use that information (this might be as simple as increasing data speed) [808] and, receiving permission to use the information in exchange for services. Optionally, selling the received information [812].

In some embodiments, a method includes monitoring a set of activities carried out by a user of a device [242], monitoring current conditions of a device, and [243] facilitating presentation on the device of one or more activities that the device could do, at least partly based on the current conditions and partly based on the capabilities of the device, in a matrix with access that has to be granted in order to have the one or more activities performed [73/245].

In some embodiments, a method includes monitoring one or more devices to determine one or more pieces of information collected (e.g., temperature data) [852], determining how many devices are collecting a particular type of data [850], receiving a query regarding one or more specific types of data (how many devices are moving at 6 mph for at least 30 minutes on a day over 80 degrees) and [851] presenting/transmitting a result of the received query [854].

In some embodiments, a method includes receiving an indication that an application needs data A and data B to provide service C [201], receiving an indication that application X has rights to data A and application Y has rights to data B [221/222/203B], and asking application X for data A and application Y for data B with the application in exchange for a share of C's profits [224].

In some embodiments, a method includes receiving an indication that an application needs data A and data B to provide service C [201], determining how many devices already have apps with access to data A and access to data B [203A], and querying those devices that, since they've already granted permission for data A and data B to other apps, would they be interested in getting service C and/or giving service C access to data A and data B [204A].

In an embodiment, as shown in FIG. 1, data from a device, e.g., device 110A is acquired, e.g., non anonymous data 44A is acquired at store 130. Non-anonymous data 44A is related to a device memory 111A of device 110A. After receiving non-anonymous data 44A from device 110, a data anonymizer 410 may apply one or more operations, e.g., anonymization operations, to non-anonymous data 44A. For example, one or more encryption algorithms or data obscuring techniques may be applied. In an embodiment of the invention, for example, data nonymizer 41 may include an anonymizer using private lookup table module 412. Anonymizer using private lookup table module 412 may apply private lookup table 418 to non-anonymous data 44A to arrive at anonymous data 1512. Anonymous data 1512 may be de-anonymizable.

In an embodiment, anonymous data 1512 may be transmitted to an application provider 62. Application provider 62 may include a services determining module 602 that determines one or more services the user of the device might want, at least partly based on the received anonymized data 1512. For example, based on the anonymized data 1512, services determining module 602 may determine that if there are 25,000 users with twenty or more contacts, then there is a sufficient information base to work with to get copies of those contacts. Then, application provider 62 may retrieve service 62A from a services pool 620. Service 62A is a service that is a "where are your friends" application that causes a notification to be generated when a user is within a particular proximity to a person on that user's contact list. Service 62A may already be present in services pool 620, or may be created by application provider 62.

In an embodiment, application provider 62 may transmit the determined service 62A to the store 130. This transmission may be external, and may involve one or more communication networks, if application provider 62 and store 130 are separate entities. If application provider 62 and store 130 are not separate entities, this transmission may be internal, e.g., via a bus, or via an exchange of data between two applications with different rights to various data and/or services.

In an embodiment, after the store 130 receives determined service 62A, access requesting module 607 of store 130 presents service 62A to the device, and requests greater access to personal information in return for providing the services. For example, access requesting module 607 instructs device 00123 to present a message of "Hi USER 456! Would you like to see when you're at a location close to one of your friends? We can bring you this service if you agree to let us access your contact list." This request is received by the device, e.g., device 110A, at request for access receiving module 304. Module 304 presents the request, and interfaces with user 456. If the access is granted, then access granting module 306 of device 110A transmits the grant of access to an access receiving module 609 of store 130. At that point, access receiving module 609 retrieves the user's contact list, and service providing module 611 provides the service 62A.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A computationally-implemented method, comprising:
   acquiring data from a device, said data includes description data that describes one or more features of a particular portion of the device;
   performing one or more operations on the acquired data to convert the acquired data into operated data;
   transmitting the operated data to a service provider
   acquiring, from the service provider, one or more services configured to be at least partly carried out by the device;
   facilitating presentation of an offer to provide the one or more acquired services at the device in exchange for access to the particular portion of the device.

2. The computationally-implemented method of claim 1, wherein said acquiring data from a device, said data includes description data that describes one or more features of a particular portion of the device comprises:
   acquiring data from the device, said data includes description data that describes particular data stored in a memory accessible to the device.

3. The computationally-implemented method of claim 2, wherein said acquiring data from the device, said data includes description data that describes particular data stored in a memory accessible to the device comprises:
   acquiring data from the device, said data includes description data that describes how many contacts are stored in a contact list of the device.

4. The computationally-implemented method of claim 1, wherein said acquiring data from a device, said data includes description data that describes one or more features of a particular portion of the device comprises:
   acquiring data from the device, said data includes description data that describes one or more abilities that are configured to be carried out by the particular portion of the device.

5. The computationally-implemented method of claim 4, wherein said acquiring data from the device, said data includes description data that describes one or more abilities that are configured to be carried out by the particular portion of the device comprises:
   acquiring data from the device, said data includes description data that describes an ability to detect proximity to a particular restaurant that is configured to be carried out by a positioning sensor of the device.

6. The computationally-implemented method of claim 4, wherein said acquiring data from the device, said data includes description data that describes one or more abilities that are configured to be carried out by the particular portion of the device comprises:
   acquiring data from the device, said data includes description data that describes one or more applications that are configured to be carried out by an interface of the device.

7. The computationally-implemented method of claim 1, wherein said acquiring data from a device, said data includes description data that describes one or more features of a particular portion of the device comprises:
   acquiring identifiable data from the device, said data related to the particular portion of the device.

8. The computationally-implemented method of claim 7, wherein said acquiring identifiable data from the device, said data related to the particular portion of the device comprises:
   acquiring the identifiable data from the device, wherein the identifiable data includes at least a unique string of text and/or numbers that identifies the device from which the identifiable data was acquired.

9. The computationally-implemented method of claim 1, wherein said acquiring data from a device, said data includes description data that describes one or more features of a particular portion of the device comprises:
   acquiring data from the device, said data describes a characteristic of data stored on the device.

10. The computationally-implemented method of claim 9, wherein said acquiring data from the device, said data describing the characteristic of data stored on the device comprises:
    acquiring data from the device, said data describes that there are twenty-five locations recorded by a position sensor of the device that are within a particular proximity to a restaurant.

11. The computationally-implemented method of claim 1, wherein said performing one or more operations on the acquired data to convert the acquired data into operated data comprises:
    performing an anonymization operation on the acquired data to convert the acquired data into operated data, wherein the acquired data includes identifiable data that identifies the device from which the identifiable data was acquired, and the operated data obscures or removes the identifiable data.

12. The computationally-implemented method of claim 11, wherein said performing an anonymization operation on the acquired data to convert the acquired data into operated data, wherein the acquired data includes identifiable data that identifies the device from which the identifiable data was acquired, and the operated data obscures or removes the identifiable data comprises:
    performing an anonymization operation on the acquired data to convert the acquired data into operated data, wherein the acquired data includes identifiable data that includes a unique code that identifies the device from which the identifiable data was acquired, the operated data obscures the identifiable data by replacing the unique code with a different code through use of a private lookup table.

13. The computationally-implemented method of claim 1, wherein said transmitting the operated data to a service provider comprises:
    transmitting the operated data, which is data that has been anonymized, to the service provider.

14. The computationally-implemented method of claim 1, wherein said transmitting the operated data to a service provider comprises:
    transmitting the operated data to a service provider that is a developer of one or more applications configured to be executed by devices of a same type as the device from which the data was acquired.

15. The computationally-implemented method of claim 1, wherein said acquiring, from the service provider, one or more services configured to be at least partly carried out by the device comprises:
    acquiring, from a service developer, one or more services configured to be at least partly carried out by the device.

16. The computationally-implemented method of claim 15, wherein said acquiring, from a service developer, one or more services configured to be at least partly carried out by the device comprises:
    receiving, from the service developer, one or more executable applications configured to be at least partly carried out by the device in a background of the device.

17. The computationally-implemented method of claim 1, wherein said acquiring, from the service provider, one or more services configured to be at least partly carried out by the device comprises:
    receiving, from an application developer, one or more applications configured to be installed and executed on the device.

18. The computationally-implemented method of claim 17, wherein said receiving, from an application developer, one or more applications configured to be installed and executed on the device comprises:
    receiving, from an application developer, a friend-finding application that is configured to find a geographic location of one or more names on a contact list of the device.

19. The computationally-implemented method of claim 1, wherein said acquiring, from the service provider, one or more services configured to be at least partly carried out by the device comprises:
    receiving, from the service provider, a service that is configured to be installed on the device and to determine, for a user of the device, a geographic location of one or more various entities in a contact list stored on the device.

20. The computationally-implemented method of claim 1, wherein said acquiring, from the service provider, one or more services configured to be at least partly carried out by the device comprises:
    receiving, from the service provider, a service that is configured to be installed on the device and to show healthy eating alternative locations within a proximity of the device.

21. The computationally-implemented method of claim 1, wherein said facilitating presentation of an offer to provide the one or more acquired services at the device in exchange for access to the particular portion of the device comprises:
    facilitating transfer of an application that is configured to carry out the one or more acquired services to the device, in exchange for access to the particular portion of the device.

22. The computationally-implemented method of claim 21, wherein said facilitating transfer of an application that is configured to carry out the one or more acquired services to the device, in exchange for access to the particular portion of the device comprises:
    facilitating transfer of an application to find one or more friends listed in the contact list that is configured to carry out a friend-finding service to the device, in exchange for access to a contact list and/or a positioning sensor of the device.

23. The computationally-implemented method of claim 1, wherein said facilitating presentation of an offer to provide the one or more acquired services at the device in exchange for access to the particular portion of the device comprises:
    facilitating presentation of an offer to sell an application that is configured to carry out the one or more acquired services at the device, in exchange for access to the particular portion of the device.

24. The computationally-implemented method of claim 23, wherein said facilitating presentation of an offer to sell an application that is configured to carry out the one or more acquired services at the device, in exchange for access to the particular portion of the device comprises:
    facilitating presentation of the offer to sell an application that finds healthy eating alternatives that is configured to carry out a healthy eating service at the device in exchange for access to a portion of the device that tracks calorie consumption.

25. The computationally-implemented method of claim 1, wherein said facilitating presentation of an offer to provide the one or more acquired services at the device in exchange for access to the particular portion of the device comprises:
    facilitating presentation of an offer to provide an application that is configured to carry out the one or more acquired services at the device, in exchange for access to the particular portion of the device.

26. The computationally-implemented method of claim 25, wherein said facilitating presentation of an offer to provide an application that is configured to carry out the one or more acquired services at the device, in exchange for access to the particular portion of the device comprises:
    facilitating presentation of the offer to provide a friend-finding application that is configured to carry out the one or more acquired services at the device, in exchange for access to a contact list of the device.

27. The computationally-implemented method of claim 1, wherein said facilitating presentation of an offer to provide the one or more acquired services at the device in exchange for access to the particular portion of the device comprises:
    facilitating presentation of the offer to provide an application that determines a location of various entities in a contact list stored on the device, in exchange for access to the contact list stored on the device.

28. A device, comprising:
    means for acquiring data from a device, said data includes description data that describes one or more features of a particular portion of the device;
    means for performing one or more operations on the acquired data to convert the acquired data into operated data;
    means for transmitting the operated data to a service provider
    means for acquiring, from the service provider, one or more services configured to be at least partly carried out by the device; and
    means for facilitating presentation of an offer to provide the one or more acquired services at the device in exchange for access to the particular portion of the device.

29. A device, comprising:
    circuitry for acquiring data from a device, said data includes description data that describes one or more features of a particular portion of the device;
    circuitry for performing one or more operations on the acquired data to convert the acquired data into operated data;
    circuitry for transmitting the operated data to a service provider
    circuitry for acquiring, from the service provider, one or more services configured to be at least partly carried out by the device; and
    circuitry for facilitating presentation of an offer to provide the one or more acquired services at the device in exchange for access to the particular portion of the device.

* * * * *